US012767330B2

(12) United States Patent
Sibbach et al.

(10) Patent No.: US 12,767,330 B2
(45) Date of Patent: Oct. 20, 2026

(54) BLENDED WING AIRCRAFT

(71) Applicant: General Electric Company, Evendale, OH (US)

(72) Inventors: Arthur William Sibbach, Boxford, MA (US); Daniel Alan Niergarth, Norwood, OH (US); Brandon Wayne Miller, Middletown, OH (US); Ryan T. Roehm, West Chester, OH (US)

(73) Assignee: General Electric Company, Evendale, OH (US)

( * ) Notice: Subject to any disclaimer, the term of this patent is extended or adjusted under 35 U.S.C. 154(b) by 35 days.

(21) Appl. No.: 19/022,152

(22) Filed: Jan. 15, 2025

(65) Prior Publication Data

US 2026/0200577 A1 Jul. 16, 2026

(51) Int. Cl.

*B64C 39/10* (2006.01)
*B64C 21/01* (2023.01)
*B64D 33/02* (2006.01)

(52) U.S. Cl.

CPC .............. *B64C 39/10* (2013.01); *B64C 21/01* (2023.01); *B64D 33/02* (2013.01); *B64C 2039/105* (2013.01); *B64D 2033/022* (2013.01)

(58) Field of Classification Search

CPC ... B64C 21/01; B64C 39/10; B64C 2039/105; B64D 2033/0226

See application file for complete search history.

(56) References Cited

U.S. PATENT DOCUMENTS 2,406,506 A 8/1946 Northrop
2,504,137 A 4/1950 Lewis
3,576,300 A * 4/1971 Palfreyman ............ B64D 27/20 244/1 N
4,019,699 A 4/1977 Wintersdorff et al.
5,897,078 A 4/1999 Burnham et al.
6,382,562 B1 5/2002 Whitlock et al.
6,527,224 B2 * 3/2003 Seidel ........................ F02C 7/04 244/53 A
6,568,632 B2 5/2003 Page et al.
6,708,924 B2 3/2004 Page et al.
6,851,650 B2 2/2005 Sankrithi
6,923,403 B1 8/2005 Dizdarevic et al.
7,509,797 B2 3/2009 Johnson (Continued)

FOREIGN PATENT DOCUMENTS

CN 215064070 U 12/2021
DE 102007014226 A1 * 9/2008 ................ B01F 3/02

(Continued)

OTHER PUBLICATIONS

Koenig, Air Force Awards a Start-Up Company $235 Million to Build an Example of a Sleek New Plane, AP News, 2023, 2 Pages. https://apnews.com/article/air-force-aviation-streamlined-plane-blended-wing-2a1704dbe8a3ac112f36220eafe291fa.

*Primary Examiner* — Joseph W Sanderson

(74) *Attorney, Agent, or Firm* — Dority & Manning, P.A.

(57) ABSTRACT

A blended wing aircraft is provided, defining a longitudinal direction and a lateral direction, the blended wing aircraft including a body; a pair of wings extending outward from the body along the lateral direction; and a propulsion system comprising an engine mounted to the body, the engine defining an axial direction and having a combustion section and a fan, the fan positioned downstream of the combustion section along the axial direction.

6 Claims, 14 Drawing Sheets

(56) References Cited

U.S. PATENT DOCUMENTS 7,644,888 B2 1/2010 Eakins et al.
7,665,689 B2 2/2010 McComb
7,793,884 B2 9/2010 Dizdarevic et al.
8,104,717 B2 1/2012 Wakayama et al.
8,128,023 B2 3/2012 Cazals
8,251,310 B2 8/2012 Marche et al.
8,262,031 B2 * 9/2012 Zha ........................ B64C 21/025 244/36
8,317,129 B1 11/2012 Lawson et al.
8,366,050 B2 2/2013 Odle et al.
8,608,109 B2 * 12/2013 Campbell ................. B64C 1/00 244/119
8,616,492 B2 12/2013 Oliver
8,651,414 B2 * 2/2014 Cazals ...................... B64C 1/26 244/54
8,783,611 B2 7/2014 Peryea et al.
9,016,040 B2 4/2015 Stuart et al.
9,126,679 B2 * 9/2015 Lippinois ................ B64C 21/01
9,567,075 B2 2/2017 Tighe
9,611,034 B1 * 4/2017 Suciu ...................... B64C 21/01
9,815,559 B2 11/2017 Moxon
9,975,643 B2 * 5/2018 Sato ....................... B64D 33/02
10,287,024 B2 * 5/2019 Suciu ..................... B64D 27/14
10,549,845 B2 * 2/2020 Epstein ................. B64C 1/0009
10,711,631 B2 7/2020 Suciu et al.
10,718,272 B2 * 7/2020 Lord ......................... F02C 9/18
10,723,474 B2 * 7/2020 Lauder .................... B64C 21/08
10,975,803 B2 * 4/2021 Romano ............... F04D 29/684
11,111,028 B2 * 9/2021 Berens .................. B64C 23/005
11,247,776 B2 2/2022 Princen et al.
11,312,491 B2 4/2022 Morris et al.
11,396,365 B2 7/2022 Page
11,453,483 B2 9/2022 Page
11,485,506 B2 * 11/2022 Tantot .................... B64D 33/02
11,498,660 B2 11/2022 Florea et al.
11,511,854 B2 11/2022 Baity et al.
11,572,838 B2 2/2023 Miller et al.
11,597,501 B2 3/2023 Page
11,597,510 B2 3/2023 Robertson et al.
11,608,173 B2 3/2023 McCullough et al.
11,772,771 B2 * 10/2023 Lazzara ................. B64D 29/02 244/130
11,827,339 B1 11/2023 Page
11,878,798 B2 1/2024 Atreya et al.
11,926,410 B2 3/2024 Page et al.
2002/0134886 A1 * 9/2002 Seidel ....................... F02K 3/04 244/53 B
2007/0023571 A1 2/2007 Kawai et al.
2008/0121756 A1 * 5/2008 McComb ................ B64C 15/02 244/60
2009/0014592 A1 * 1/2009 Zha ....................... B64C 21/025 244/199.4
2011/0000548 A1 * 1/2011 Sanders .................... F02C 7/04 137/15.1
2011/0271824 A1 11/2011 Wahlquist
2013/0119198 A1 * 5/2013 Campbell ................. B64C 1/00 156/79
2014/0283921 A1 * 9/2014 Lippinois ............... B64D 33/02 137/15.1
2015/0259059 A1 * 9/2015 Chandler .................. B64C 1/26 244/45 R
2015/0284067 A1 * 10/2015 Suciu ...................... B64C 19/00 244/87
2016/0009391 A1 1/2016 Friesel
2016/0122005 A1 5/2016 Florea et al.
2016/0144972 A1 5/2016 Florea et al.
2016/0280388 A1 * 9/2016 Sato ........................ B64C 21/10
2018/0037331 A1 * 2/2018 Suciu ..................... B64D 27/14
2018/0209445 A1 * 7/2018 Tantot ...................... F02K 3/062
2018/0230945 A1 * 8/2018 Romano ................ B64D 27/14
2018/0298829 A1 * 10/2018 Lord ....................... B64C 21/02
2018/0339765 A1 * 11/2018 Epstein ................... B64C 21/01
2018/0339784 A1 * 11/2018 Lauder .................... B64C 21/10
2018/0354639 A1 * 12/2018 Berens .................... F02C 7/042
2018/0362169 A1 12/2018 Du
2019/0276135 A1 9/2019 van Merkensteijn, IV
2020/0024982 A1 * 1/2020 Zysman .................. B64C 11/06
2020/0080477 A1 * 3/2020 Murphy .................... F02C 9/20
2020/0248560 A1 * 8/2020 Joly ....................... B64D 33/02
2020/0331591 A1 10/2020 Page et al.
2021/0339844 A1 * 11/2021 Llamas Sandin ......... B64C 9/38
2022/0033067 A1 * 2/2022 Page ...................... B64D 29/04
2022/0194569 A1 6/2022 Georgeson et al.
2023/0002037 A1 1/2023 Page
2023/0029560 A1 2/2023 Stefes
2023/0242254 A1 8/2023 Page
2023/0264801 A1 * 8/2023 Lazzara .................. B64C 39/10 244/130
2023/0278706 A1 9/2023 Page et al.
2023/0322382 A1 10/2023 Dindar et al.
2024/0253763 A1 * 8/2024 Vassberg ................... B64C 1/16

FOREIGN PATENT DOCUMENTS

| | | | | | |
|---|---|---|---|---|---|
| DE | 102014201040 | A1 | * | 7/2015 | ............... B64C 3/10 |
| FR | 2619074 | A1 | * | 2/1989 | |
| FR | 2880867 | A1 | * | 7/2006 | ............... B64C 3/16 |
| FR | 2909358 | A1 | | 6/2008 | |
| FR | 2938823 | A1 | | 5/2010 | |
| FR | 2938824 | A1 | | 5/2010 | |
| FR | 3107308 | A1 | * | 8/2021 | ............... B64C 1/16 |
| GB | 759491 | A | | 10/1956 | |
| GB | 2492501 | A | * | 1/2013 | ........... B64C 11/001 |
| WO | WO2007/104940 | A1 | | 9/2007 | |
| WO | WO2021/118401 | A1 | | 6/2021 | |

* cited by examiner

BLENDED WING AIRCRAFT

FIELD

The present disclosure relates to a blended wing aircraft.

BACKGROUND

Traditional aircraft designs include a fuselage and a pair of wings. The fuselage is a central body of the aircraft that holds passengers, cargo, equipment, and the like. The wings are attached to the fuselage and are the primary lift-generating surfaces, particularly during constant-altitude flight operations. The aircraft can include engines mounted to the wings to generate thrust for the aircraft, and a tail assembly having a vertical stabilizer and a horizontal stabilizer for vector control. While such an aircraft design is a well-established and proven design, improvements to allow for increased efficiency and cargo utilization would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
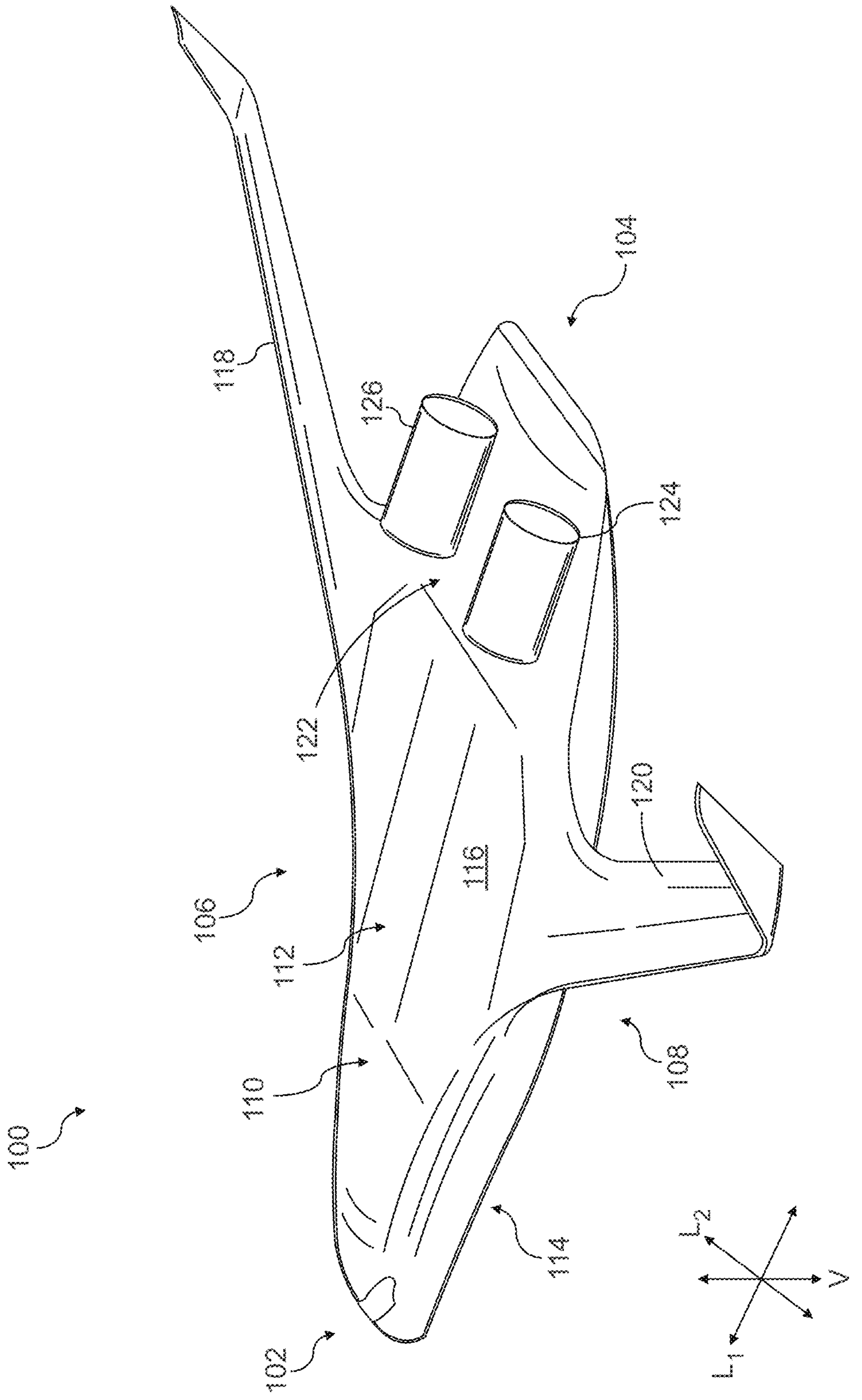
FIG. 1 is a perspective view of an aircraft in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The singular forms “a”, “an”, and “the” include plural references unless the context clearly dictates otherwise.

The term “at least one of” in the context of, e.g., “at least one of A, B, and C” refers to only A, only B, only C, or any combination of A, B, and C.

The phrases “from X to Y” and “between X and Y” each refers to a range of values inclusive of the endpoints (i.e., refers to a range of values that includes both X and Y).

The term “turbomachine” refers to a machine including one or more compressors, a heat generating section (e.g., a combustion section), and one or more turbines that together generate a torque output.

The term “gas turbine engine” refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term “combustion section” refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms “forward” and “aft” refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

As noted above, improvements to traditional aircraft design to allow for increased efficiency and cargo utilization would be welcomed in the art. The inventors of the present disclosure found that utilization of a blended wing aircraft design can provide such an improvement. In particular, with the blended wing aircraft design, a body of the aircraft can contribute to lift, while also allowing for increased cargo space, improved aerodynamic efficiency, etc.

In addition to the above benefits, it was found that the body design allows for mounting engines of the blended wing aircraft in a pusher configuration, which can provide for a less complex engine for a given thrust class and efficiency level. In particular, arranging the engines in a pusher configuration locates a fan of the respective engine next to a power turbine (also referred to as a low pressure turbine), such that a length of a shaft driving the fan may be reduced. In addition, with at least certain mounting configurations, mounting the engines in the pusher configuration can allow a fan of each engine to ingest a relatively large amount of boundary layer airflow over the body of the aircraft. In such a manner, the fan(s) can reenergize such airflow and reducing a total drag on the aircraft, which in turn can improve an overall aerodynamic efficiency of the aircraft.

Specifically, the present disclosure is directed to a blended wing aircraft defining a longitudinal direction and a lateral direction, the blended wing aircraft including: a body; a pair of wings extending outward from the body along the lateral direction; and a propulsion system having an engine mounted to the body, the engine defining an axial direction and having a combustion section and a fan, the fan positioned downstream of the combustion section along the axial direction.

Referring now to the drawings, wherein identical numerals indicate the same elements throughout the figures, FIG. 1 provides a perspective view of an aircraft 100 as may incorporate various embodiments of the present disclosure. In particular, as will be discussed in greater detail, below, the aircraft 100 of FIG. 1 is configured as a blended wing aircraft.

The aircraft 100 defines a longitudinal direction $L_1$ that extends therethrough, a lateral direction $L_2$, a vertical direction V, a forward end 102 and an opposing aft end 16 along the longitudinal direction $L_1$, a starboard side 106 and an opposing port side 108 along the lateral direction $L_2$, and a top side 112 and an opposing bottom side 114 (also referred to as an "bottom side") along the vertical direction V. The vertical direction V may be defined by the aircraft 100 when in a flat orientation, such as when the aircraft 100 is parked on flat ground.

Further, it will be appreciated that the aircraft 100 includes a body 110 extending longitudinally from the forward end 102 of the aircraft 100 to the aft end 104 of the aircraft 100, and a pair of wings. In particular, the aircraft 100 includes a first wing 118 and a second wing 120. The first wing 118 extends outwardly from the body 110 generally along the lateral direction $L_2$ on the starboard side 106 and the second wing 120 similarly extends outwardly from the body 110 generally along the lateral direction $L_2$ on the port side 108. Although not depicted, it will be appreciated that each of the wings 118, 120 may include one or more leading edge flaps, one or more trailing edge flaps, or both.

The exemplary aircraft 100 of FIG. 1 also includes a propulsion system 122. The exemplary propulsion system 122 depicted includes a plurality of engines, and more specifically includes a first engine 124 and a second engine 126. In the embodiment depicted, the first engine 124 and the second engine 126 are spaced from one another along the lateral direction $L_2$, and are mounted to the body 110 of the aircraft 100 at the aft end 104 of the aircraft 100. It will be appreciated, that as used herein, the term "at the aft end 104" refers to a location along the longitudinal direction $L_1$ closer to the aft end 104 of the aircraft 100 than the forward end 102 of the aircraft 100. Briefly, it will further be appreciated that for the embodiment depicted, the first engine 124 and second engine 126 are mounted to the body 110 of the aircraft 100 on the top side 112 of the aircraft 100.

As noted above, the aircraft 100 is configured as a blended wing aircraft. In such a manner, it will be appreciated that the body 110 of the aircraft 100 is generally shaped like an airfoil, such that the body 110 of the aircraft 100 generates upward lift (along the vertical direction V) during steady altitude flight operations. For example, during a cruise operating condition of the aircraft 100, the body 110 may contribute between 10% and 95% of a total upward lift for the aircraft 100, such as between 25% and 90% of the total upward lift for the aircraft 100, with the remainder being provided by, e.g., the first and second wings 118, 120. In addition, the first and second wings 118, 120 are aerodynamically contoured to have a smooth transition with the body 110 of the aircraft 100, which can reduce an overall drag on the aircraft 100.

Figure 2:
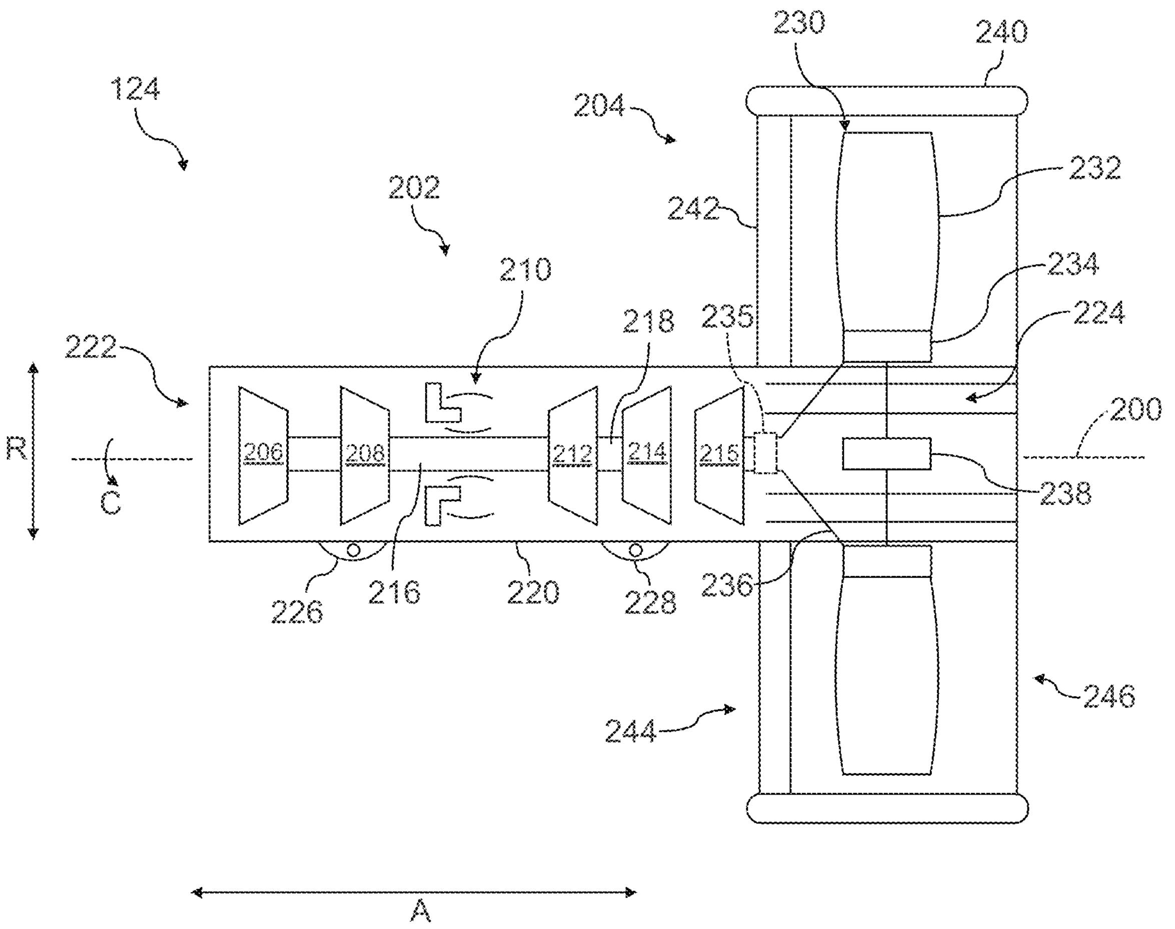
FIG. 2 is a schematic, cross-sectional view of a first engine of a propulsion system of the aircraft of FIG. 1 in accordance with an exemplary embodiment of the present disclosure.

Referring now to FIG. 2, a schematic cross-sectional view of a first engine 124 of a propulsion system of an aircraft is presented in accordance with an exemplary embodiment of the present disclosure. In certain exemplary embodiments, the first engine 124 of FIG. 2 may be incorporated into the propulsion system 122 of the exemplary aircraft 100 of FIG. 1.

The first engine 124 is configured as a gas turbine engine. For example, the first engine 124 includes a turbomachine 202 and a fan assembly 204, and defines an axial direction A, a radial direction R, and a circumferential direction C. The fan assembly 204 includes a fan 230 positioned proximate an aft end of the first engine 124. More specifically, the fan 230 is located downstream of a combustion section 210 along the axial direction A. In such a manner, it will be appreciated that the engine 124 is configured in a "pusher" configuration.

The turbomachine 202 of the gas turbine engine defines a turbomachine inlet 222 and a turbomachine exhaust 224, and includes a compressor section, a combustion section 210, and a turbine section. The compressor section includes a low-pressure compressor 206 and a high-pressure compressor 208. The combustion section 210 receives compressed air from the compressor section and mixes it with fuel for combustion, generating high-energy exhaust gases. These exhaust gases then flow into the turbine section, which includes a high-pressure turbine 212, a low-pressure turbine 214, and a drive turbine 215 in serial flow order. The high-energy exhaust gases expand through the turbine section, causing the turbines to rotate and produce mechanical work. In particular, it will be appreciated that for the embodiment shown, the turbomachine 202 further includes a high pressure shaft 216 extending between and mechanically coupling the high-pressure compressor 208 and high pressure turbine 212, and a low pressure shaft 218 extending between and mechanically coupling the low pressure compressor 206 and low pressure turbine 214. Moreover, as will be appreciated, the drive turbine 215 is rotatably de-coupled from the compressor section, and more specifically is rotatably de-coupled from both the low pressure shaft 218 and the high pressure shaft 216.

As noted, the fan assembly 204 includes the fan 230 and defines a fan inlet 244 and a fan exhaust 246. The fan 230 in turn includes a plurality of fan blades 232 and a fan disk 234, with the plurality of fan blades 232 coupled to the fan disk 234. The fan assembly 204 further includes a fan shaft 236 extending between and mechanically coupling the drive turbine 215 of the turbine section of the turbomachine 202 with the fan 230 (via the fan disk 234). In such a manner, the drive turbine 215 is rotatably coupled to the fan 230 to drive the fan 230.

The fan 230, being in close proximity to the drive turbine 215, benefits from a reduced need for a long fan shaft that is concentric with, e.g., the high pressure shaft 216, thus simplifying the engine's mechanical complexity.

As is depicted in phantom, the first engine 124 may further include a reduction gearbox 235, to reduce a speed of the fan 230 relative to the drive turbine 215. Also, the fan 230 is, for the embodiment depicted, a variable-pitch fan, which can be adjusted to different pitch angles to provide, e.g., forward or reverse thrust as needed. In particular, the first engine 124 includes a pitch change mechanism 238 to adjust the pitch of the fan blades 232 of the fan 230. In such a manner, the fan 230 is moveable between a forward thrust pitch angle and a reverse thrust pitch angle. Notably, given that the first engine 124 is arranged in a pusher configuration, an airflow through fan 230 is not provided to the turbomachine inlet 222 of the turbomachine 202. In such a manner, the fan 230 may be moved to a reverse thrust position, reversing an airflow direction of an airflow through the fan 230, without starving the turbomachine inlet 222 of an airflow needed to power the drive turbine 215 and fan 230.

The gas turbine engine 124 further includes a nacelle 240 that encloses the fan 230 and defines in part the fan inlet 244 and fan exhaust 246. The nacelle 240 surrounds the fan 230 and is coupled to the turbomachine 202 through a plurality of inlet guide vanes 242 located upstream of the fan blades 232 of the fan 230. In such a manner, it will be appreciated that the gas turbine engine of FIG. 2 is more specifically configured as a turbofan engine.

Briefly, it will be appreciated that the first engine 124 further includes a forward mounting bracket 226 and an aft mounting bracket 228. The forward and aft mounting brackets 226, 228 may be coupled to one or more respective frames of the first engine 124 and turbomachine 202 of the first engine 124 (e.g., compressor forward frame, compressor mid-frame, turbine mid-frame, turbine rear frame, fan frame, etc.).

The first engine 124 depicted in FIG. 2 is an example of one exemplary embodiment of an engine that may be utilized with one or more aspects of the present disclosure. However, it should be understood that the present disclosure is not limited to this specific configuration and can include other types of gas turbine engines, such as open rotor engines (see FIGS. 19 and 20), direct drive engines, fixed pitch engines, engines without a dedicated drive turbine for the fan, etc.

Figure 3:
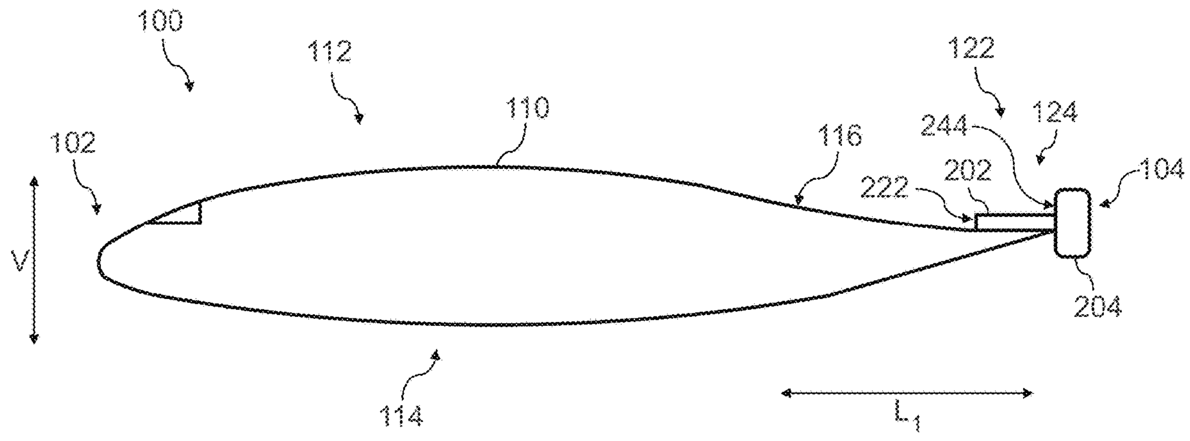
FIG. 3 is a side, schematic view of exemplary aircraft of FIG. 1.
Figure 4:
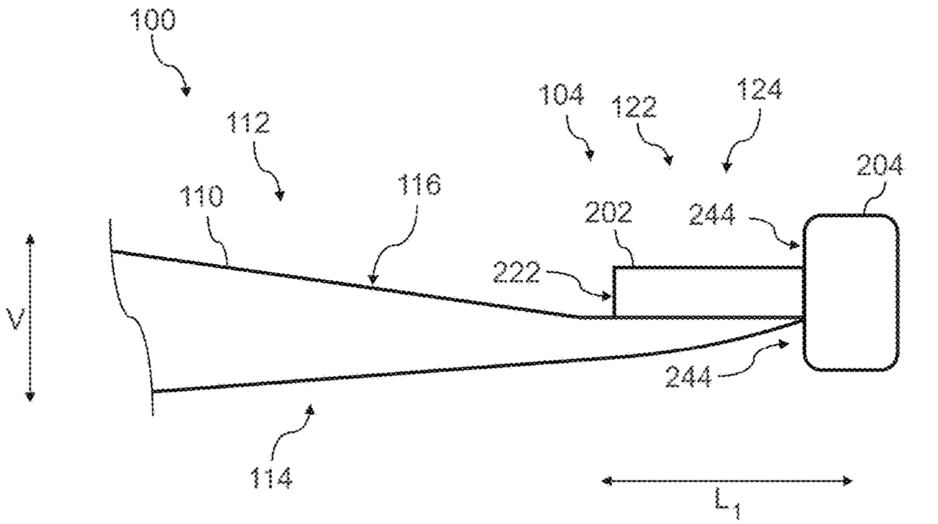
FIG. 4 is a close-up view of the body and first engine of FIG. 3.

Referring now to FIGS. 3 and 4, FIG. 3 provides a side schematic view of an exemplary aircraft 100 of the present disclosure, and FIG. 4 provides a close-up view of an aft end 104 of the aircraft 100 of FIG. 3. The aircraft 100 of FIGS. 3 and 4 may be configured in substantially the same manner as the exemplary aircraft of FIG. 1. Accordingly, the same or similar numbers may refer to the same or similar parts.

For example, in the embodiment of FIGS. 3 and 4, the aircraft 100 includes a body 110 that defines a top side 112 and an opposing bottom side 114. The body 110 extends longitudinally from a forward end 102 of the aircraft 100 to an aft end 104. The aircraft 100 includes a propulsion system with a first engine 124 mounted to the top side 112 of the body 110 at the aft end 104. The engine 124 includes a turbomachine 202 and a fan assembly 204, and is shown in a pusher configuration (see, e.g., the exemplary engine configuration of FIG. 2).

The mounting of the engine 124 on the top side 112 of the body 110 at the aft end 104 can provide several aerodynamic advantages. By positioning the engine 124 at this location, an airflow over the body 110 (e.g., a boundary layer airflow) can be smoothly transitioned into the engine 124, reducing aerodynamic drag and potentially improving the aircraft's fuel efficiency. In addition, mounting the pusher configuration first engine 124 on the top side 112 of the body 110 reduces a risk of foreign object ingestion by the turbomachine 202 of the first engine 110 during, e.g., takeoff and landing operations.

For example, referring particularly to FIG. 4, a portion of the airflow can be guided into the turbomachine 202 of the engine 124 through a turbomachine inlet 222, where it is compressed, combusted, and expanded to generate mechanical power to drive the fan (not shown, see FIG. 2) of the fan assembly 204. The fan of the fan assembly 204, being at the aft end of the engine 124, can further ingest a boundary layer airflow that has developed along the body 110. This boundary layer airflow, which typically has a lower velocity than a free-stream airflow due to its interaction with the flowpath surface 116 of the body 110, can be ingested by the fan 244 and re-energized to reduce an aerodynamic drag on the aircraft 100.

More specifically, for the embodiment of FIG. 4, the fan assembly 204 defines a fan inlet 244 for receiving airflow. The inlet 244 is positioned to capture airflow from the top side 112 of the aircraft 100, as well as from the bottom side 114 of the aircraft 100. In particular, the fan assembly 204 is configured in an overhung arrangement, with a portion of the fan assembly 204 extending above the flowpath surface 116 of the body 110 at the aft end 104 and a portion of the fan assembly 204 extending below the flowpath surface 116 of the body 110 at the aft end 104. This dual-sided airflow entry can potentially increase an amount of air ingested by the engine 124 for thrust generation, and for re-energizing the boundary layer airflow over the aircraft 100.

Notably, the engine 124 is illustrated as being mounted directly to the body 110 without the use of additional structures such as pylons. In particular, the turbomachine 202 is mounted directly to the body 110 in the embodiment depicted. For example, mounting brackets 226, 228 (see FIG. 2), may be coupled directly to a frame of the body 110 of the aircraft 100. This direct mounting approach can offer a reduction in the number of components and overall weight of the aircraft 100.

Figure 17:
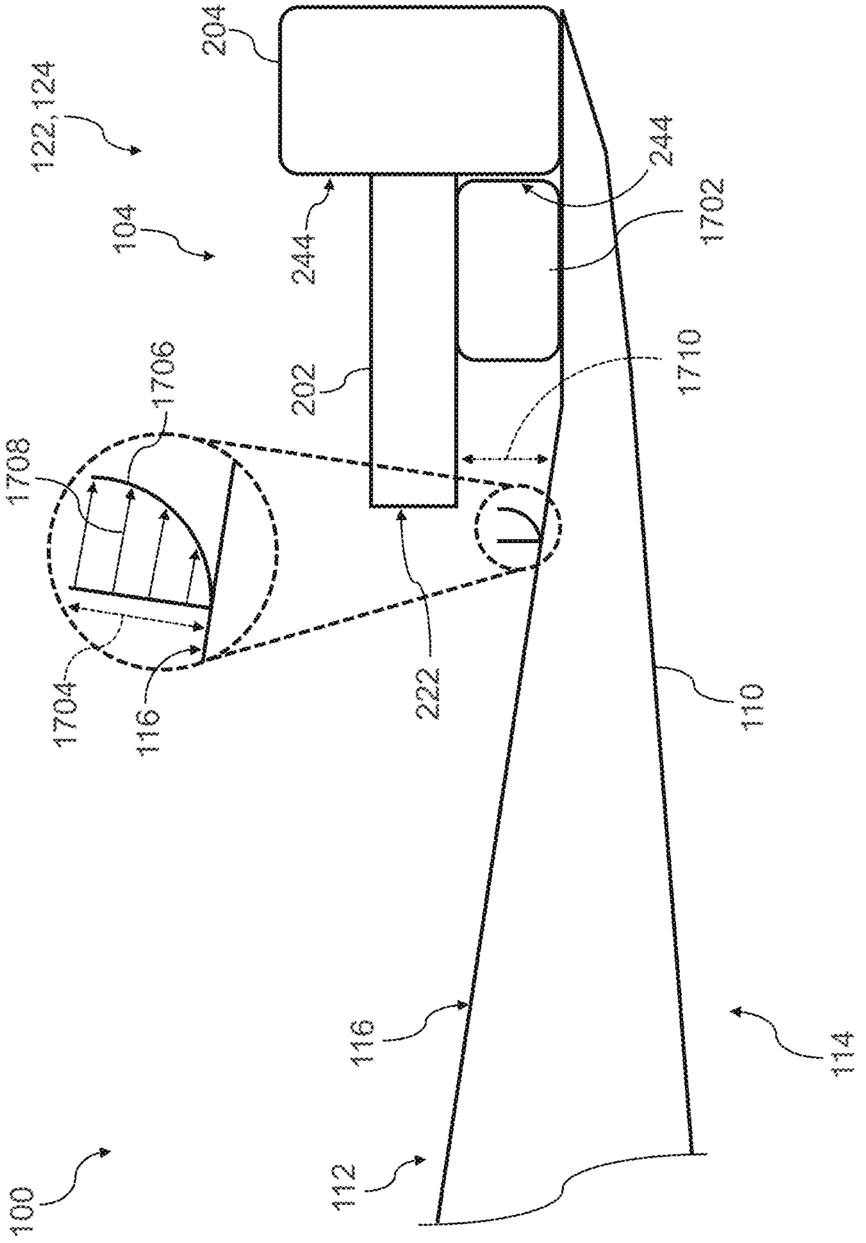
FIG. 17 is a close-up, side, schematic view of an aft end of an aircraft having a first engine in accordance with another exemplary embodiment.
Figure 18:
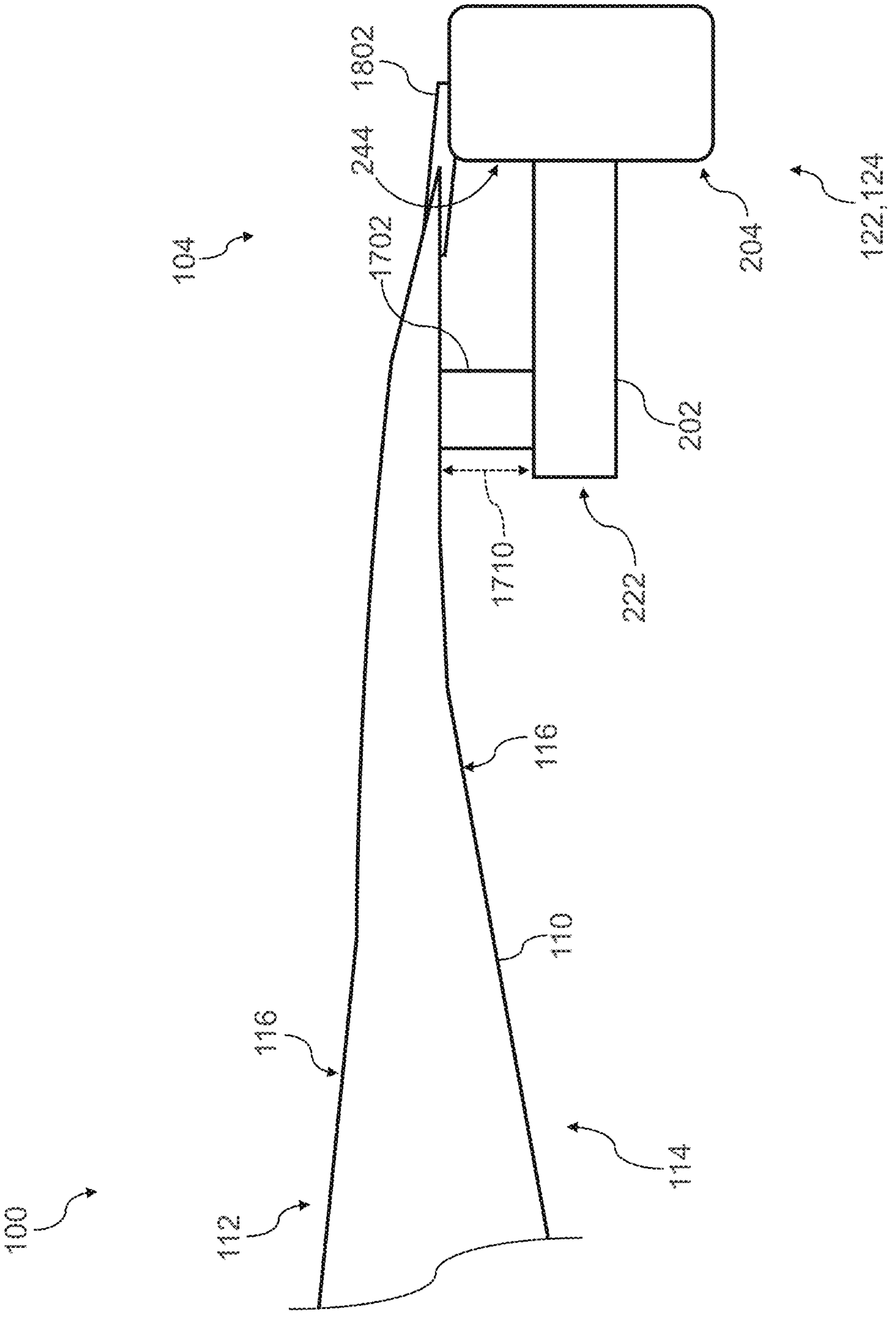
FIG. 18 is a close-up, side, schematic view of an aft end of an aircraft having a first engine in accordance with another exemplary embodiment.

However, in alternative embodiments, the engine 124 may be mounted using pylons or other support structures that can provide additional clearance or positioning flexibility for the engine 124 relative to the body 110 (see, e.g., FIGS. 17 and 18).

It should be noted that the present disclosure is not limited to the specific arrangement shown in FIGS. 3 and 4.

Figure 5:
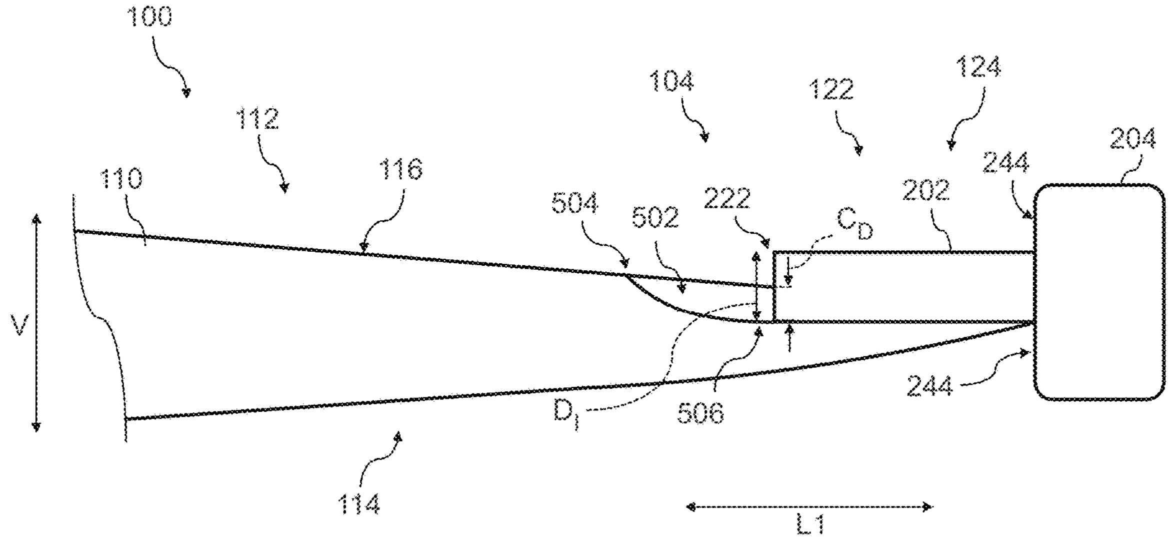
FIG. 5 is a close-up, side, schematic view of an aft end of an aircraft having a first engine in accordance with another exemplary embodiment.

For example, referring now to FIG. 5, a close-up, side, schematic view of an aft end of an aircraft 100 having a first engine 124 in accordance with another exemplary embodiment is depicted. The exemplary aircraft 100 and first engine 124 of FIG. 5 may be configured in substantially the same manner as the exemplary aircraft 100 and first engine 124 described above with reference to FIGS. 3 and 4. The same or similar numbers may refer to the same or similar parts.

For example, in the embodiment of FIG. 5, the aircraft 100 includes a body 110 that defines a top side 112 and an opposing bottom side 114. The body 110 extends longitudinally from a forward end 102 of the aircraft 100 to an aft end 104. The aircraft 100 includes a propulsion system 122 with a first engine 124 mounted to the top side 112 of the body 110 at the aft end 104. The engine 124 includes a turbomachine 202 and a fan assembly 204, and is arranged in a pusher configuration (see, e.g., the exemplary engine configuration of FIG. 2).

The engine 124 of FIG. 5 is mounted to the top side 112 of the aircraft 100 as in the embodiment of FIGS. 3 and 4, above. However, in this embodiment, the body 110 of the aircraft 100 includes a flowpath surface 116 defining an inlet channel 502. The inlet channel 502 is configured to guide airflow into a turbomachine inlet 222 of the turbomachine 202. The inlet channel 502 is integral to the body 110 and shaped to facilitate a smooth and efficient flow of air into the turbomachine 202, which may improve an operation of the engine 124.

As will be appreciated from the view in FIG. 5, the inlet channel 502 defined by the flowpath surface 116 extends along a longitudinal direction $L_1$ of the aircraft 100 from an upstream end 504 to a downstream end 506. The downstream end 506 is located at the turbomachine inlet 222 to direct airflow over the flowpath surface 116 into the turbomachine 202 of the engine 124.

It will further be appreciated that the turbomachine 202 defines an inlet diameter $D_I$ and the inlet channel 502 defines a channel depth $C_D$ at the downstream end 506. In the embodiment shown the inlet diameter $D_I$ and channel depth $C_D$ are each defined in a vertical direction V. In the embodiment depicted, the channel depth $C_D$ is at least 5% of the inlet diameter $D_I$ and up to 95% of the inlet diameter $D_I$, such as at least 10%, at least 20%, at least 30%, or at least 40% of the inlet diameter $D_I$ and up to 90%, such as up to 80%, such as up to 70% of the inlet diameter $D_I$.

It will be appreciated, however, that the present disclosure contemplates that the inlet channel 502 may be designed with varying depths and widths to accommodate different airflow requirements and engine configurations.

Figure 6:
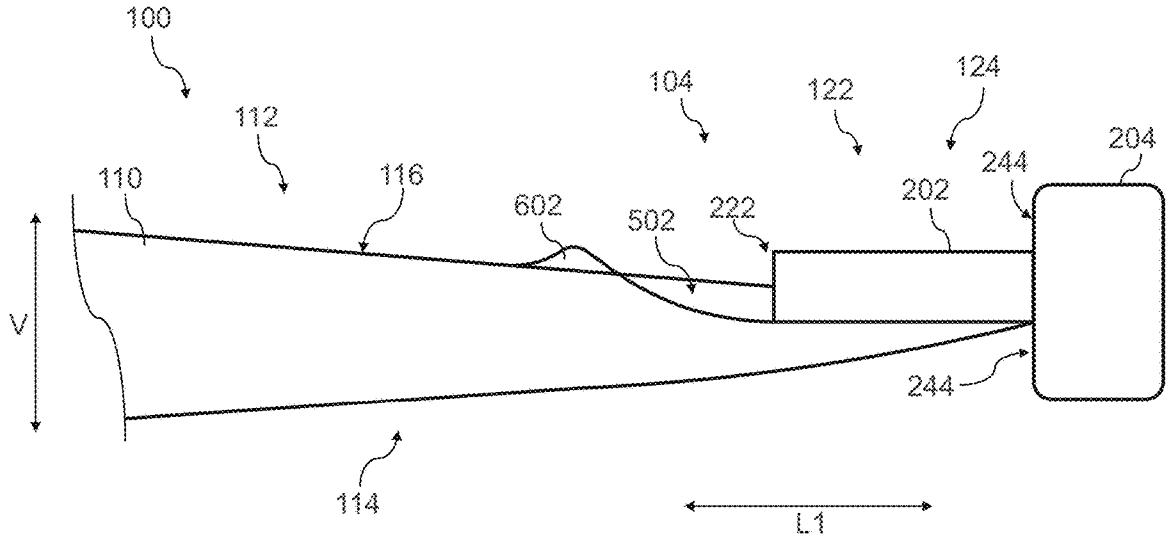
FIG. 6 is a close-up, side, schematic view of an aft end of an aircraft having a first engine in accordance with another exemplary embodiment.

Referring now to FIG. 6, a close-up, side, schematic view of an aft end of an aircraft 100 having a first engine 124 in accordance with another exemplary embodiment is provided. The exemplary aircraft 100 and first engine 124 of FIG. 6 may be configured in substantially the same manner as the exemplary aircraft 100 and first engine 124 described above with reference to FIG. 5. The same or similar numbers may refer to the same or similar parts.

For example, in the embodiment of FIG. 6, the aircraft 100 includes a body 110 that defines a top side 112 and an opposing bottom side 114. The body 110 extends longitudinally from a forward end 102 of the aircraft 100 to an aft end 104. The aircraft 100 includes a propulsion system 122 with a first engine 124 mounted to the top side 112 of the body 110 at the aft end 104. The engine 124 includes a turbomachine 202 and a fan assembly 204, and is shown in a pusher configuration (see, e.g., the exemplary engine configuration of FIG. 2). The turbomachine 202 defines a turbomachine inlet 222 and the fan assembly 204 defines a fan inlet 244. Further, a flowpath surface 116 defines an inlet channel 502.

In this embodiment, however, the flowpath surface 116 further includes a deflection bump 602 positioned upstream of an inlet 222 to the turbomachine 202 (e.g., upstream of the inlet channel 502 or within the inlet channel 502), and more specifically for the embodiment shown, upstream of the inlet channel 502. The deflection bump 602 is configured to deflect undesirable elements such as ice, debris, or other foreign objects away from the turbomachine inlet 222. This feature is particularly advantageous as it helps in overcoming the ingestion of such elements by the turbomachine 202 despite the turbomachine 202 being mounted adjacent to the flowpath surface 116 of the body 110 (e.g., directly to the body 110). The deflection bump 602 is designed to have a height and shape that effectively redirects heavier particles away from the turbomachine inlet 222 while allowing the airflow to continue into the engine 124 with minimal disruption.

Figure 7:
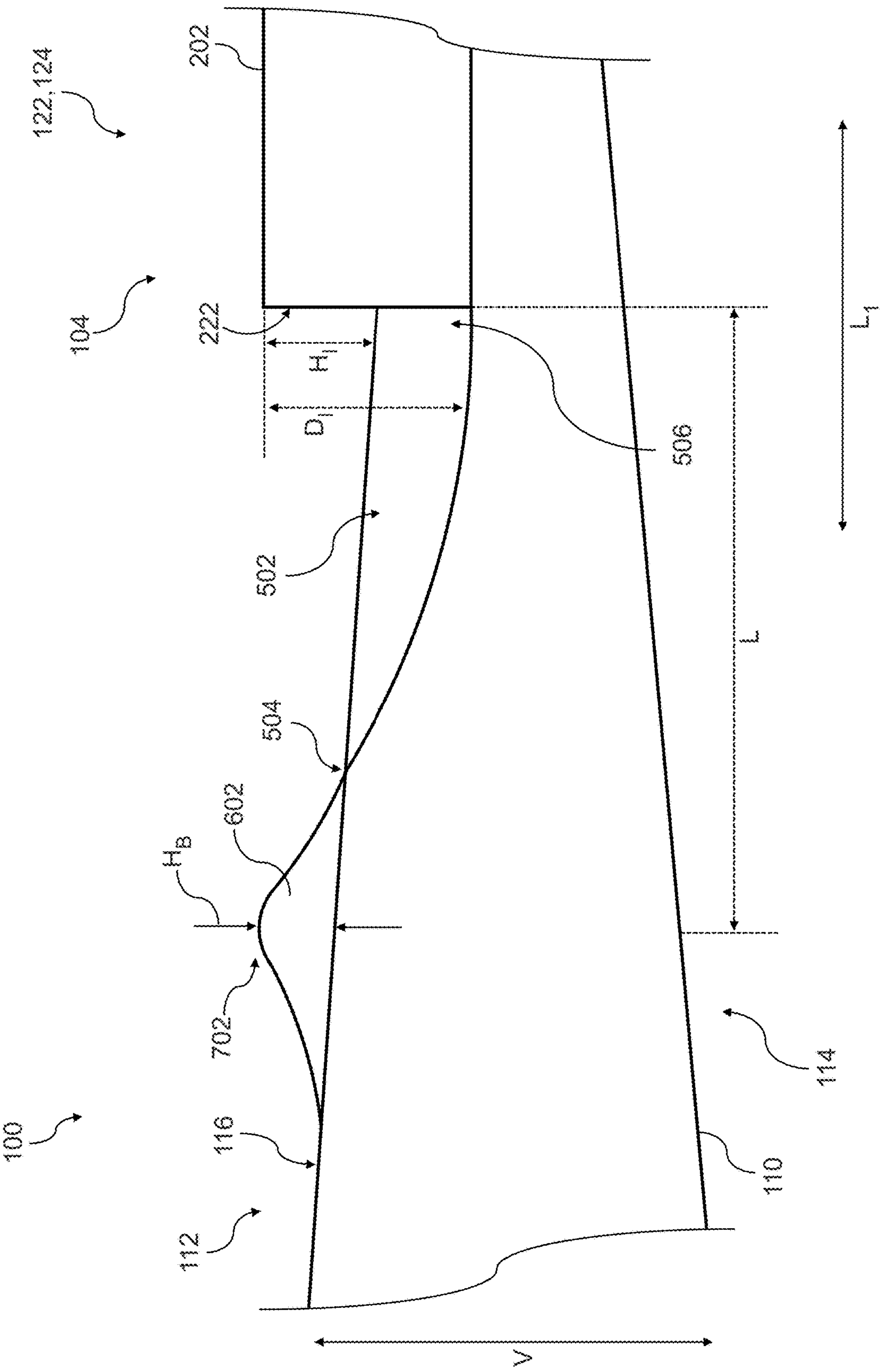
FIG. 7 is a close-up, side, schematic view of the embodiment of FIG. 6.

Referring now to FIG. 7, a close-up, side, schematic view of the aft end 104 of the aircraft 100 having the first engine 124 of FIG. 6 is provided. As noted above, the aircraft 100 includes the body 110 defining the top side 112 and the bottom side 114. The top side 112 of the body 110 defines the flowpath surface 116 that includes the deflection bump 602 upstream of the inlet channel 502 for the first engine 124.

The deflection bump 602 further defines an apex 702 and a height $H_B$, with the height $H_B$ of the deflection bump 602 being measured in the vertical direction V from the flowpath surface 116 at a location adjacent to the deflection bump 602 (in a lateral direction $L_2$ (see, e.g., FIG. 1)) to the apex 702. The height $H_B$ of the bump 602 influences an effectiveness of the deflection of particulates away from the turbomachine inlet 222. Notably, the turbomachine inlet 222 defines the diameter $D_I$ and a height $H_I$ (the height $H_I$ being defined from a top of the inlet channel 502 to a top of the turbomachine inlet 222 in the vertical direction V; i.e., $H_I=D_I-C_D$ (see FIG. 5)). The aircraft 100 further defines a length L from the apex 702 of the bump 602 to the turbomachine inlet 222 along the longitudinal direction $L_I$, as is indicated, providing a reference for the positioning of the bump 602 relative to the inlet 222.

The relationship between the height $H_B$ of the bump 602, the height $H_I$ of the turbomachine inlet 222, the inlet diameter $D_I$ of the turbomachine inlet 222, and the length L is depicted. These dimensions can determine the aerodynamic properties and the protective capabilities of the deflection bump 602. In particular, in the course of designing an aircraft 100 that effectively deflected particulates from the turbomachine inlet 222, the inventors found a relationship of several of these parameters that can result in a deflection bump 602 that provides a desired deflection of particulates while maintaining a desired flow of air into the engine 124.

More specifically, the inventors found that a deflection bump defining bump height $H_B$ greater than or equal to $H_I/(\pi\times L)$ and less than or equal to $[\pi\times(H_I+D_I)]/L$ can provide a desired deflection of particulates while maintaining a desired flow of air into the engine 124.

The present disclosure contemplates various embodiments of the deflection bump 602, wherein the dimensions and positioning can be adjusted based on specific aircraft designs and operational requirements. The deflection bump 602 can be provided to deflect a range of particulate sizes and densities, ensuring the protection of the turbomachine 202 under various environmental conditions. Additionally, the deflection bump 602 can be constructed from materials that offer the necessary durability and impact resistance to withstand the forces encountered during flight, which may be different than a material forming a remainder of the body 110.

Figure 8:
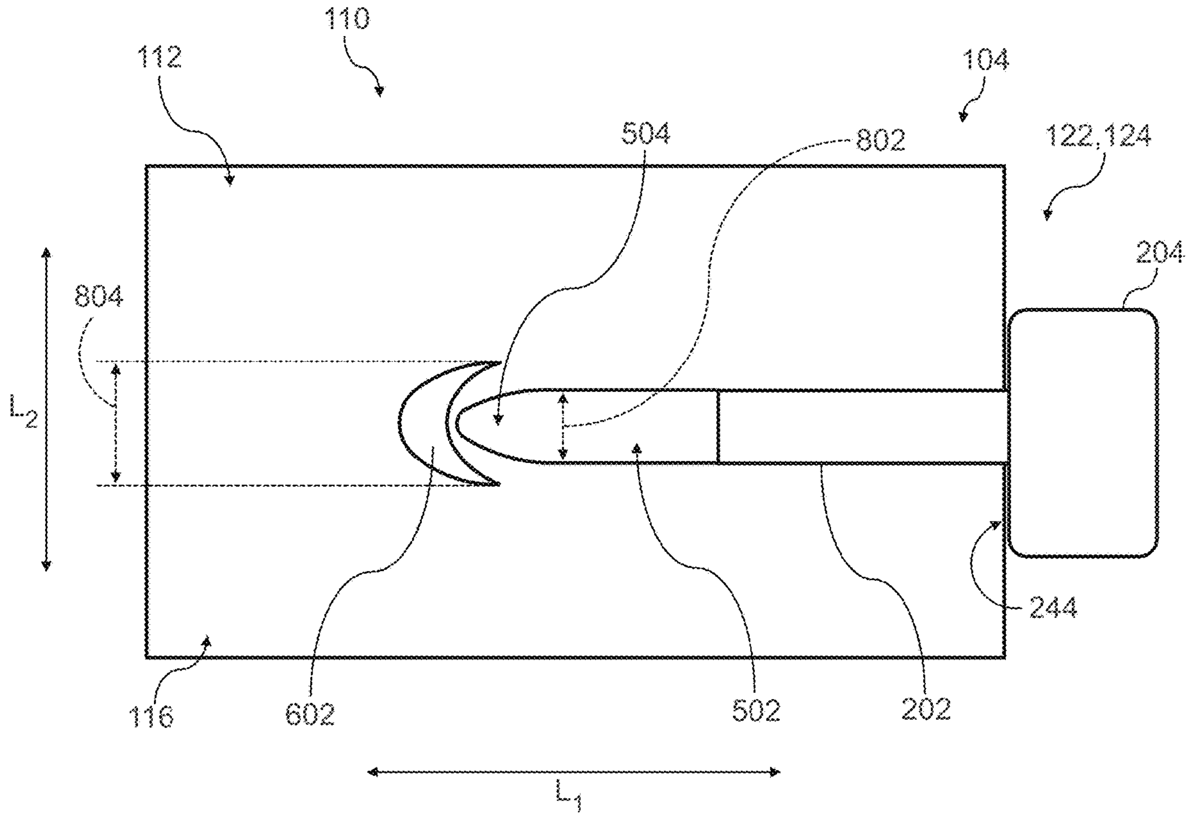
FIG. 8 is a top side view of the exemplary aircraft and first engine of FIGS. 6 and 7.

Referring now to FIG. 8, a top side view of the exemplary aircraft 100 and first engine 124 of FIGS. 6 and 7 is shown. This figure provides a view of the relative sizes and positioning of the deflection bump 602 and the inlet channel 502 in the lateral direction $L_2$ of the aircraft 100. The deflection bump 602, as previously described, may be an integral feature designed to deflect heavier particles such as ice or debris away from the inlet channel 502, thus preventing them from entering the turbomachine 202 of the first engine 124.

The deflection bump 602 defines a width 804 in the lateral direction $L_2$. The width 804 is depicted as being larger than a width 802 of the upstream end 504 of the inlet channel 502. This configuration may allow for the deflection bump 602 to provide a desired barrier to redirect particles while allowing the air to continue towards the inlet channel 502 and into the fan inlet 244 of the fan assembly 204. The design of the deflection bump 602 and the inlet channel 502 is such that it complements the aerodynamic efficiency of the aircraft 100 while also reducing a potential for ingestion of foreign objects into the engine 124.

The present disclosure contemplates various embodiments where the dimensions and positioning of the deflection bump 602 and the inlet channel 502 may be altered to suit different aircraft designs and operational requirements. For example, the width 804 of the deflection bump 602 can be increased or decreased based on the size of the particles expected to be encountered during flight. Similarly, the width 802 of the inlet channel 502 at the upstream end 504 can be adjusted to modify an amount of airflow directed into the turbomachine 202.

Figure 9:
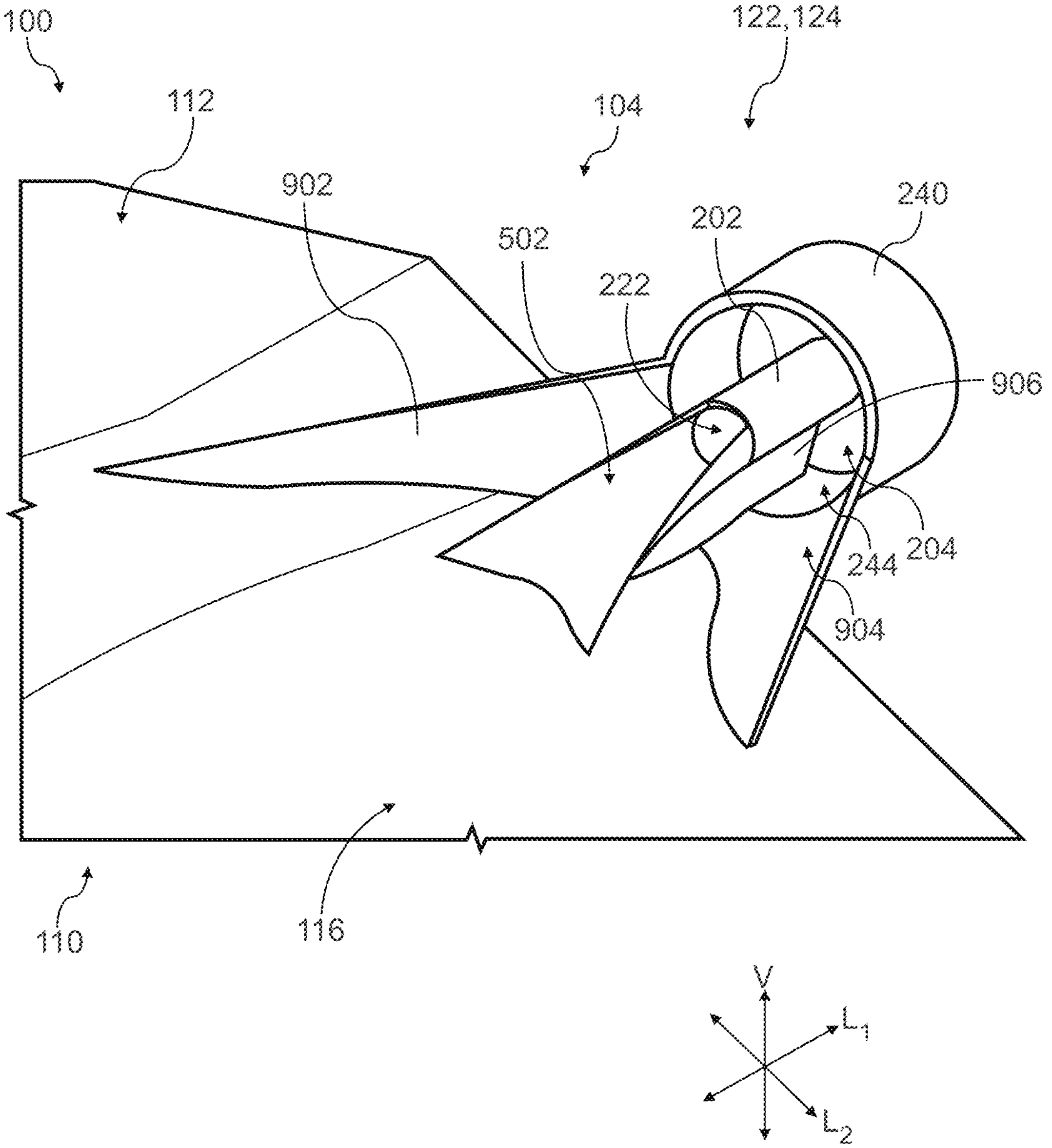
FIG. 9 is a close-up, perspective view of an aft end of an aircraft having a first engine in accordance with another exemplary embodiment.

Referring now to FIG. 9, a close-up, perspective view of an aft end 104 of an aircraft 100 having a first engine 124 in accordance with another exemplary embodiment is provided. The aircraft 100 of FIG. 9 may be configured in substantially the same manner as one or more of the exemplary aircraft 100 described hereinabove. Accordingly, the same or similar numbers may refer to the same or similar parts.

For example, the aircraft 100 includes a body 110 defining a top side 112 and a bottom side 114, and a propulsion system 122 having the first engine 124 mounted to the top side 112 of the body 110. The first engine 124 includes a turbomachine 202 defining a turbomachine inlet 222 and a fan assembly 204 defining a fan inlet 244.

In this embodiment, the flowpath surface 116 of the body 110 defines an inlet channel 502, or rather a first inlet channel 502, that extends to the turbomachine inlet 222 of the first engine 124. This inlet channel 502 is designed to guide airflow efficiently into the turbomachine 202, thus contributing to the propulsion capabilities of the aircraft 100.

As noted, the first engine 124 further includes the fan assembly 204, which is positioned in a pusher configuration, downstream of, e.g., a combustion section (now shown) of the turbomachine 202. The fan inlet 244 is located to receive airflow only from the top side 112 of the aircraft 100 in the embodiment shown.

Additionally, FIG. 9 depicts a second inlet channel 902 and a third inlet channel 904, both of which are defined by the flowpath surface 116 of the body 110. These inlet channels 902, 904 are positioned on either side of the first inlet channel 502 and are configured to extend to the fan inlet 244 of the first engine 124. The presence of dedicated inlet channels for both the turbomachine inlet 222 and the fan inlet 244 is advantageous as it may maintain a desired amount of airflow being provided to these inlets 222, 244.

The embodiment also showcases a lower bifurcation 906 of the first engine 124, which is part of the structure of the first engine 124. The lower bifurcation 906 supports the turbomachine 202 relative to an outer nacelle 240 of the first engine 124, while also providing for support for various systems of the first engine 124 (e.g., fuel flow lines, oil flow lines, electrical lines, etc.). In the embodiment depicted, the second inlet channel 902 and the third inlet channel 904 feed airflow into the fan inlet 244, and are separated from one another at the fan inlet 244 by the lower bifurcation 906.

Figure 10:
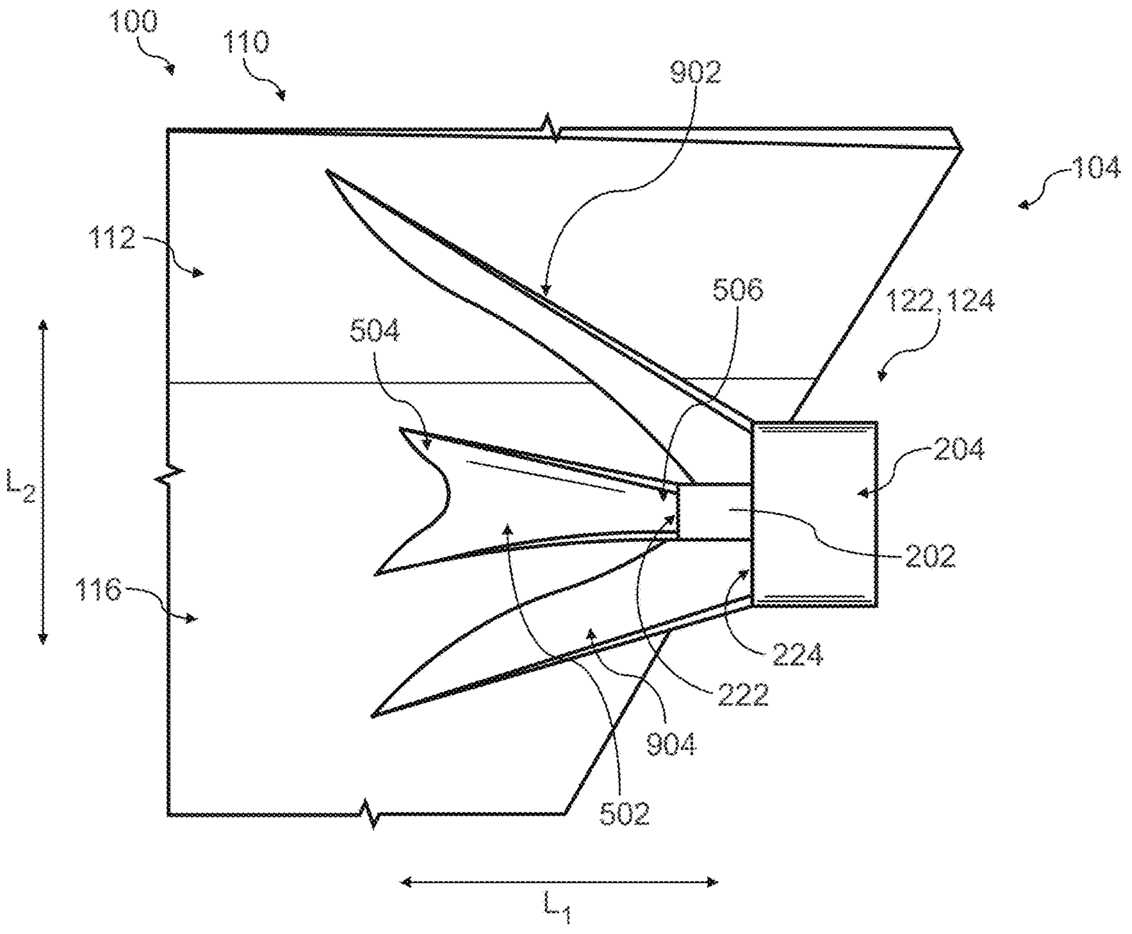
FIG. 10 is a top view of the aft end of the exemplary aircraft of FIG. 9.

Referring now to FIG. 10, a top view is provided of the aft end 104 of the exemplary aircraft 100 of FIG. 9.

As will be appreciated from the view of FIG. 10, the first inlet channel 502 is wider at an upstream end 504 than at a downstream end 506, which can help to guide more of a boundary layer airflow over the body 110 smoothly into the turbomachine 202. In particular the upstream end 504 defines an upstream width along the lateral direction $L_2$, and the downstream end 506 defines a downstream width along the lateral direction $L_2$ less than the upstream width.

In addition to the first inlet channel 502, the flowpath surface 116 further defines the second inlet channel 902 and the third inlet channel 904. The first inlet channel 502, the second inlet channel 902, and the third inlet channel 904 are each defined by the flowpath surface 116 on the top side 112 of the body 110 of the aircraft 100. Further, the second and third inlet channels 902, 904 are positioned on opposite sides of the first inlet channel 502 and are configured to extend to the fan inlet 244 of the fan assembly 204. The second and third inlet channels 902, 904 serve similarly to direct airflow into the fan inlet 244 of the engine 124. This can be particularly advantageous as it allows the fan assembly 204 to ingest, e.g., an increased amount of the boundary layer airflow over the body 110, which is typically slower than a free-stream airflow, and re-energize it, reducing a total drag on the aircraft 100 and improving the overall aerodynamic efficiency.

The present disclosure contemplates that the first inlet channel 502, the second inlet channel 902, and the third inlet channel 904 can be configured with various geometries and dimensions to adjust the airflow characteristics for different engine types and performance requirements of the aircraft 100.

Figure 11:
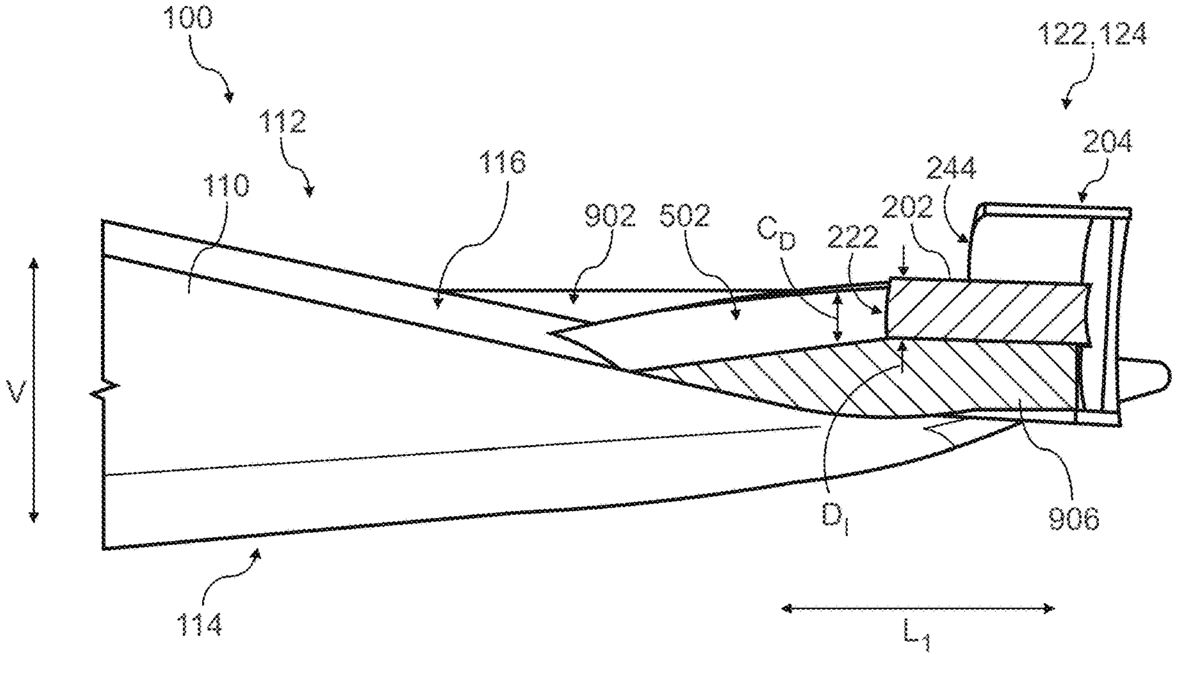
FIG. 11 is a close-up, side, cross-sectional view of the aft end of the exemplary aircraft of FIG. 9.

Referring briefly now to FIG. 11, a close-up, side, cross-sectional view of the aft end 104 of the exemplary aircraft 100 of FIGS. 9 and 10 is provided.

As is depicted, the flowpath surface 116 of the body 110 defines the first inlet channel 502, which extends to the turbomachine inlet 222 of the first engine 124. The first inlet channel 502 is designed to guide airflow efficiently into the turbomachine 202, thus contributing to the propulsion capabilities of the aircraft 100. The inlet channel 502 has a depth $C_D$ and the turbomachine inlet 222 has an inlet diameter $D_I$. The depth $C_D$ is depicted as being equal to at least 25% of the inlet diameter $D_I$ of the turbomachine inlet 222 in this embodiment, such as at least 50%, such as at least 75%, and less than or equal to 100%.

Figure 12:
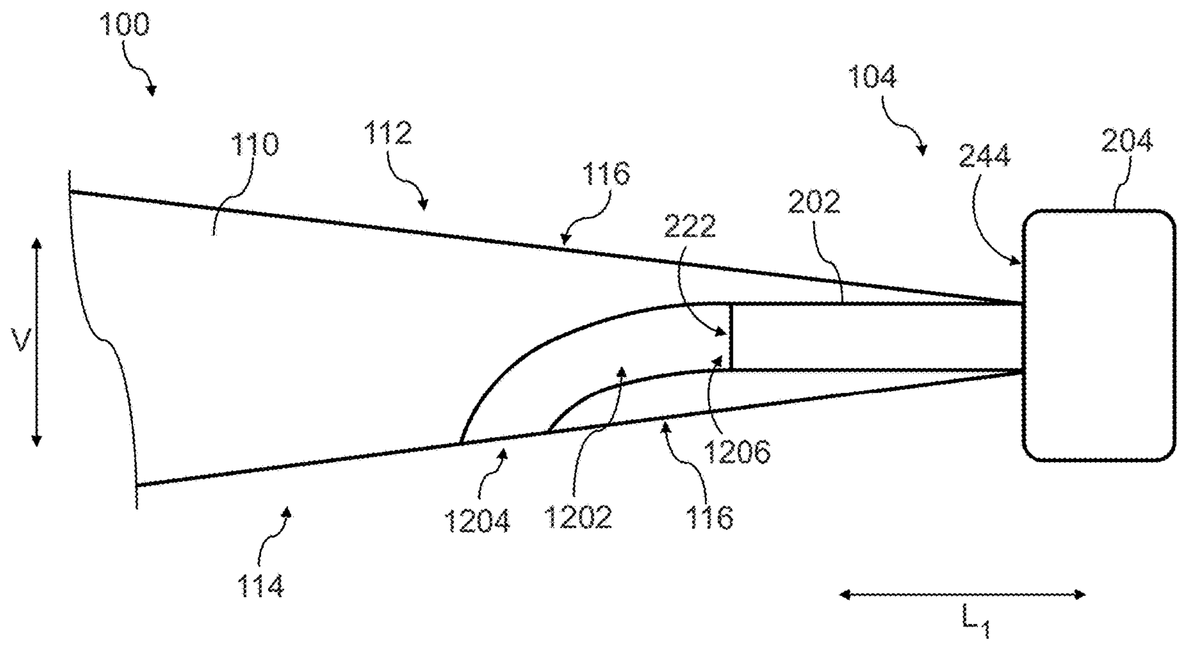
FIG. 12 is a close-up, side, schematic view of an aft end of an aircraft having a first engine in accordance with another exemplary embodiment.

Referring now to FIG. 12, a close-up, side, schematic view of an aft end 104 of an aircraft 100 having a first engine 124 in accordance with another exemplary embodiment is shown. The aircraft 100 may be configured in a similar manner as one or more of the exemplary first engines 124 described above with reference to, e.g., FIGS. 3 and 4, and accordingly the same or similar numbers may refer to the same or similar parts.

For example, the aircraft 100 includes a body 110 that defines a top side 112 and a bottom side 114. The aircraft 100 further includes a propulsion system having the first engine 124, which for the embodiment shown is integrated with the body 110 of the aircraft 100. More specifically, for the embodiment of FIG. 12, the body 110 defines a trailing edge (e.g., an aft-most portion; not separately labeled), and the first engine 124 is mounted at the trailing edge. More specifically, still, for the embodiment depicted, the first engine 124 is integrated into the trailing edge.

Additionally, the first engine 124 includes a turbomachine 202 and a fan assembly 204. The turbomachine 202 defines a turbomachine inlet 222 and the fan assembly 204 defines a fan inlet 244.

In this embodiment, the body 110 defines an airflow duct 1202 extending from a duct inlet 1204 to a duct outlet 1206. The airflow duct 1202 is positioned within the body 110 to provide a flow of air to the first engine 124, and more specifically to the turbomachine inlet 222 of the turbomachine 202.

In particular, the duct inlet 1204 is located at the flowpath surface 116 on the bottom side 114 of the body 110, allowing air to enter the airflow duct 1202 through the duct inlet 1204. The location of the duct inlet 1204 is such that it can capture air from the surrounding environment and channel it into the airflow duct 1202. The duct outlet 1206, positioned at the turbomachine inlet 222 of the turbomachine 202, serves as the exit point for the air that has been routed through the airflow duct 1202. The air exiting the duct outlet 1206 is then available for the turbomachine 202 to compress and utilize in the combustion process for power generation, thrust generation, or both.

The first engine 124, as noted, further includes the fan assembly 204 located downstream of the turbomachine inlet 222 along the longitudinal direction $L_1$. The fan assembly 204, which includes the fan inlet 244, extends aft of the flowpath surface 116 of the body 110, and is located downstream of the flowpath surface 116 of the body 110. In such a manner, the fan assembly 204 may be considered "overhung" from the body 110. Notably, with such a configuration, the fan inlet 244 extends upward past the flowpath surface 116 at the aft end 104 and downward past the flowpath surface 116 at the aft end 104. In such a manner, the fan assembly 204 (and fan 230 (see FIG. 2)) can ingest boundary layer airflow over the top side 112 and bottom side 114, reducing an overall drag on the aircraft 100.

The present disclosure contemplates various embodiments of the airflow duct 1202, where the duct inlet 1204 and the duct outlet 1206 may be configured in different sizes and shapes to accommodate the specific airflow requirements of the turbomachine 202. The positioning of the duct inlet 1204 on the bottom side 114 of the body 110 can be modified to capture a desired amount of air with a desired amount of drag, providing designed efficiency for the propulsion system 122.

Figure 13:
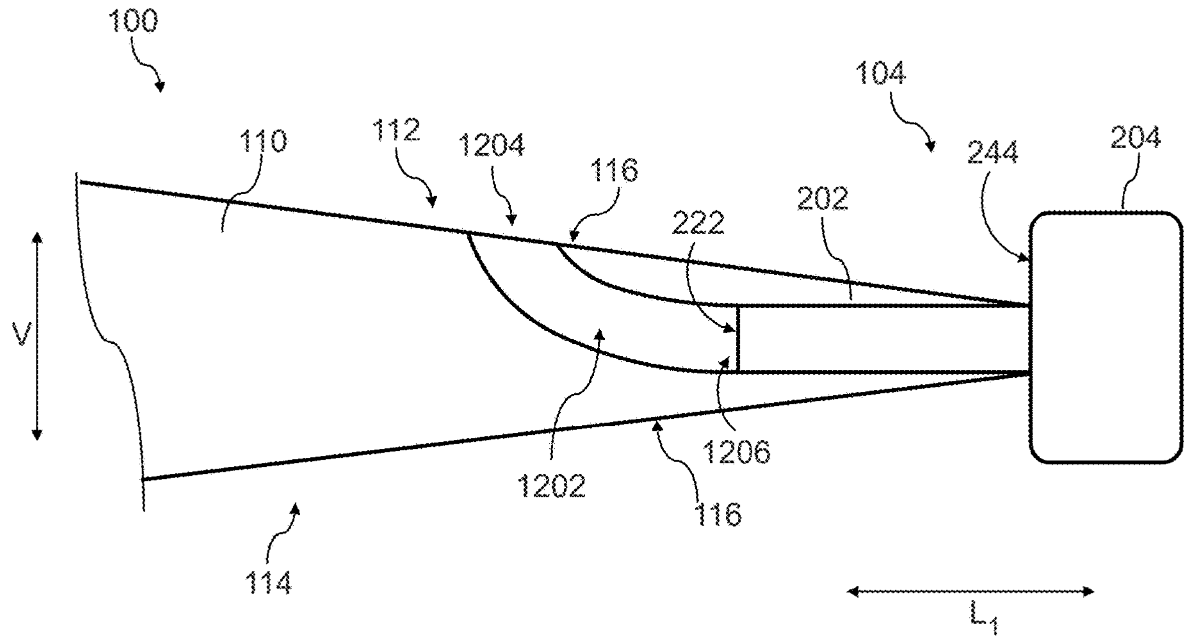
FIG. 13 is a close-up, side, schematic view of an aft end of an aircraft having a first engine in accordance with another exemplary embodiment.

In will be appreciated, however, that in other exemplary embodiments, the duct inlet 1204 may be positioned at other suitable locations. For example, referring now to FIG. 13, providing a close-up, side, schematic view of an aft end 104 of an aircraft 100 having a first engine 124 in accordance with another exemplary embodiment, an inlet duct 1204 of an airflow duct 1202 is located on a top side 112 of a body 110 of the aircraft 100. The aircraft 100 and first engine 124 of FIG. 13 may otherwise be configured in a similar manner as the exemplary aircraft 100 and first engine 124 of FIG. 12.

Positioning the duct inlet 1204 the top side 112 of the body 110 at the flowpath surface 116 may allow air to enter the airflow duct 1202 with desired resistance and drag, with, e.g., reduced risk of foreign object ingestion at takeoff and landing operations.

Moreover, it will be appreciated that other exemplary embodiments of the present disclosure may include various other exemplary embodiments. For example, FIG. 14 through 16 each provide a close-up, side, schematic view of an aft end 104 of an aircraft 100 having a first engine 124 in accordance with other exemplary embodiments of the present disclosure. The exemplary embodiments of FIG. 14 may be configured in substantially the same manner as the exemplary embodiment of FIGS. 3 and 4; the exemplary embodiments of FIG. 15 may be configured in substantially the same manner as the exemplary embodiment of FIG. 5; and the exemplary embodiments of FIG. 16 may be configured in substantially the same manner as the exemplary embodiment of FIGS. 6 and 7. The same or similar numbers may refer to the same or similar parts.

Figure 14:
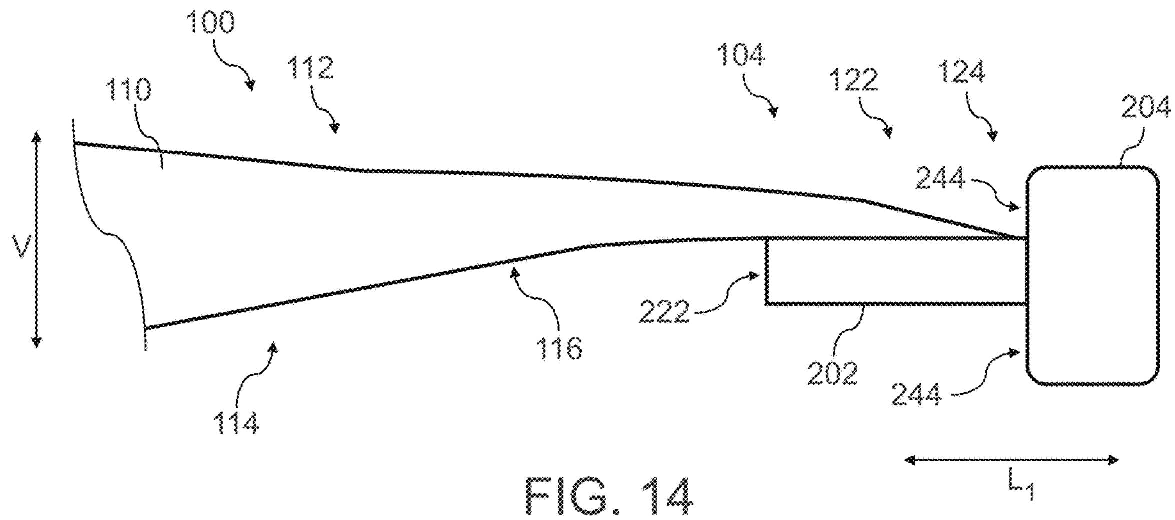
FIG. 14 is a close-up, side, schematic view of an aft end of an aircraft having a first engine in accordance with another exemplary embodiment.
Figure 15:
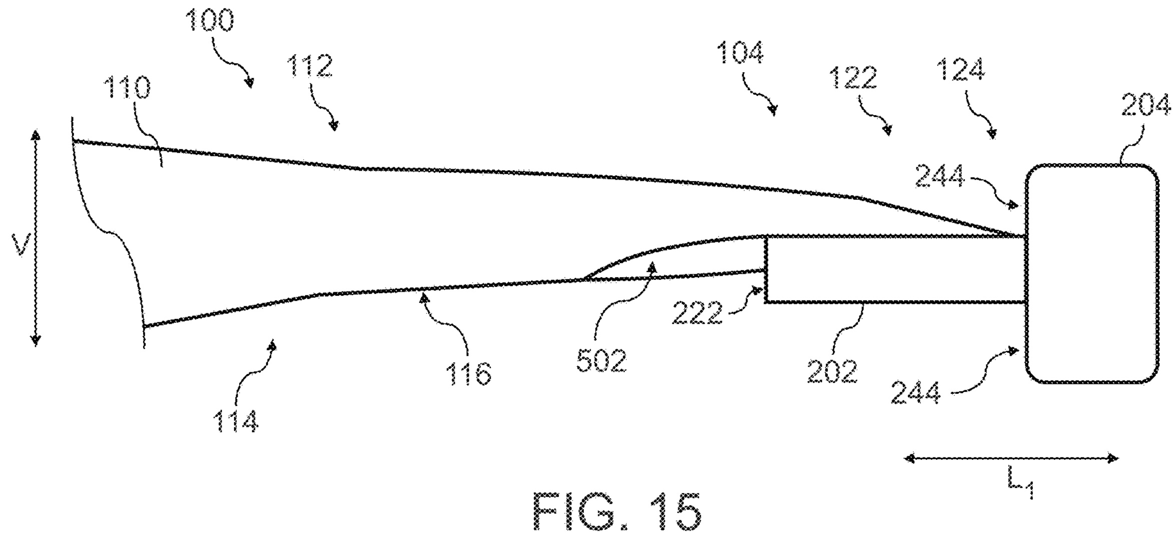
FIG. 15 is a close-up, side, schematic view of an aft end of an aircraft having a first engine in accordance with another exemplary embodiment.
Figure 16:
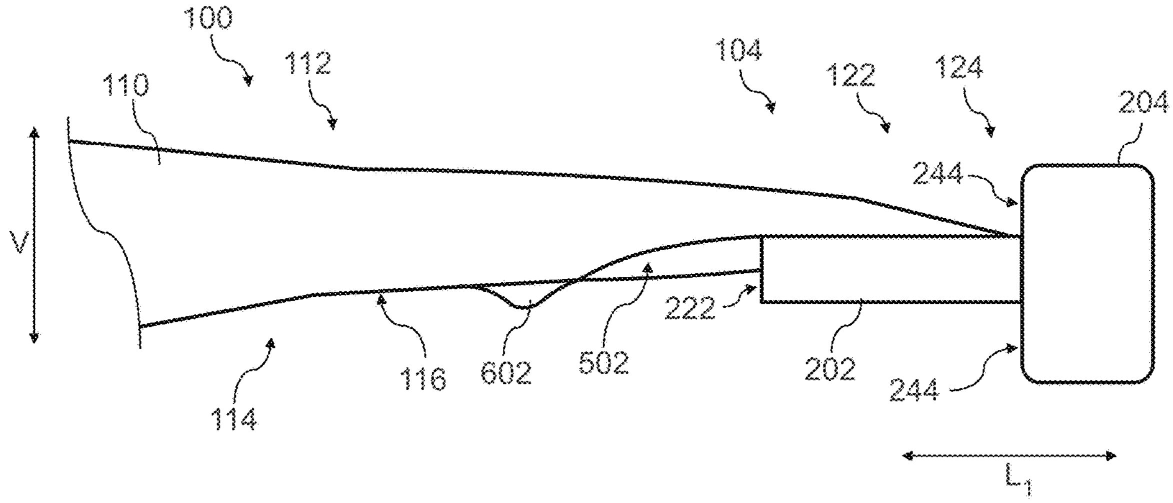
FIG. 16 is a close-up, side, schematic view of an aft end of an aircraft having a first engine in accordance with another exemplary embodiment.

It will be appreciated, however, that each of the exemplary embodiments of FIGS. 14 through 16 include the first engine 124 mounted to a bottom side 114 of a body 110 of the respective aircraft 100. With such a configuration, a turbomachine inlet 222 may be less susceptible to ingesting, e.g., ice during flight operations of the aircraft 100.

Notably, for each of these embodiments, the first engine 124 is mounted at a trailing edge of the body 110, with a fan assembly 204 of the respective first engine 124 is mounted in an overhung configuration, such that a fan inlet 244 ingests an airflow over a top side 112 of the body 110 and over the bottom side 114 of the body 110. In such a manner, the fan assembly 204 may ingest a relatively large amount of boundary layer airflow over the body 110, reducing an overall drag of the aircraft 100.

Referring now to FIG. 17, a close-up, side, schematic view of an aft end of an aircraft 100 having a first engine 124 in accordance with another exemplary embodiment is depicted. The exemplary aircraft 100 and first engine 124 of FIG. 17 may be configured in a similar manner as one or more of the exemplary aircraft 100 and first engines 124 described hereinabove, and the same or similar numbers may refer to the same or similar parts.

For example, the aircraft 100 includes a body 110 that defines a top side 112 and a bottom side 114, and the first engine 124 includes a turbomachine 202, which includes a turbomachine inlet 222, and a fan assembly 204. The first engine 124 is mounted to the top side 112 of the body 110, contributing to the thrust required for the propulsion of the aircraft 100.

However, in this exemplary embodiment, the turbomachine 202 is not mounted adjacent to the body 110, and instead the turbomachine 202 is coupled to the body 110 using a pylon 1702. The pylon 1702 serves as a structural connection between the body 110 and the turbomachine 202, providing the support for the engine 124 while allowing for a desired spacing of the turbomachine inlet 222 from the flowpath surface 116 of the body 110. This spacing may reduce or prevent an ingestion by the turbomachine 202 of boundary layer airflow over the body 110.

The boundary layer airflow over the flowpath surface 116 is visually represented in FIG. 17 by a velocity curve 1706 and an arrow 1708 representing the velocity of the boundary layer airflow. The boundary layer airflow is present up to a height 1704 over the flowpath surface 116, and can result in asymmetric airflow ingestion by the turbomachine 202. In the embodiment depicted, the turbomachine inlet 222 spaced from the flowpath surface 116 a distance 1710, greater than the height 1704 of the boundary layer airflow (e.g., during a cruise operating condition). Positioning of the turbomachine inlet 222 spaced from the flowpath surface 116 in such a manner may therefore avoid the ingestion of this slower-moving boundary layer airflow, resulting in a more consistent airflow being provided to an entirety of the inlet 222 of the turbomachine 202.

The fan assembly 204 of the first engine 124 is positioned downstream of the turbomachine 202. The fan assembly 204 defines a fan inlet 244. The fan inlet 244, by contrast, is positioned with at least a portion adjacent to the flowpath surface 116, such that the fan inlet 244 may ingest a portion of the boundary layer airflow. Although not separately labeled, an outer nacelle of the first engine 124 (see, FIG. 2) may be coupled directly to the body 110 of the aircraft 100 with such a configuration.

The present disclosure contemplates various embodiments of the first engine 124, where the pylon 1702 may be configured in different sizes and shapes to accommodate the specific airflow requirements of the turbomachine 202. The positioning of the pylon 1702 can be modified to provide a desired spacing from the flowpath surface 116, providing for a desired efficiency of the propulsion system 122.

Referring now to FIG. 18, a close-up, side, schematic view of an aft end of an aircraft 100 having a first engine 124 in accordance with another exemplary embodiment is presented. The exemplary aircraft 100 and first engine 124 of FIG. 18 may be configured in a similar manner as one or more of the exemplary aircraft 100 and first engines 124 described hereinabove, such as the exemplary aircraft 100 and first engine 124 of FIG. 17, and the same or similar numbers may refer to the same or similar parts.

The first engine 124 is mounted to a body 110 of the aircraft 100 through a pylon 1702, such that a turbomachine inlet 222 is spaced from the flowpath surface 116 of the body 110 a distance 1710 (which may be greater than a height of a boundary layer airflow; see height 1704 in FIG. 17).

However, for the exemplary embodiment of FIG. 18, the first engine 124 is mounted to a bottom side 114 of a body 110 of the aircraft 100. With such a configuration, a turbomachine inlet 222 may be less susceptible to ingesting, e.g., ice during flight operations of the aircraft 100.

Notably, in the embodiment depicted, the fan section, defining a fan inlet 244, is positioned such that the fan inlet 244 is located aft of the body 110 of the aircraft 100. Accordingly, the embodiment depicted further includes an airflow guide 1802 extending from the body 110 of the aircraft 100 to the fan assembly 204 to guide a boundary layer airflow over the bottom side 114 of the body 110 into the fan inlet 244. Although not separately labeled, the airflow guide 1802 may extend from the body 110 to an outer nacelle of the first engine 124 (see, FIG. 2) to couple to the outer nacelle to the body 110 of the aircraft 100 and facilitate a desired boundary layer airflow ingestion.

The present disclosure contemplates various embodiments of the first engine 124, where the pylon 1702 may be configured in different sizes and shapes to accommodate the specific airflow requirements of the turbomachine 202. The positioning of the pylon 1702 can be modified to ensure a desired spacing from the flowpath surface 116, enhancing an efficiency of the propulsion system 122.

Figure 19:
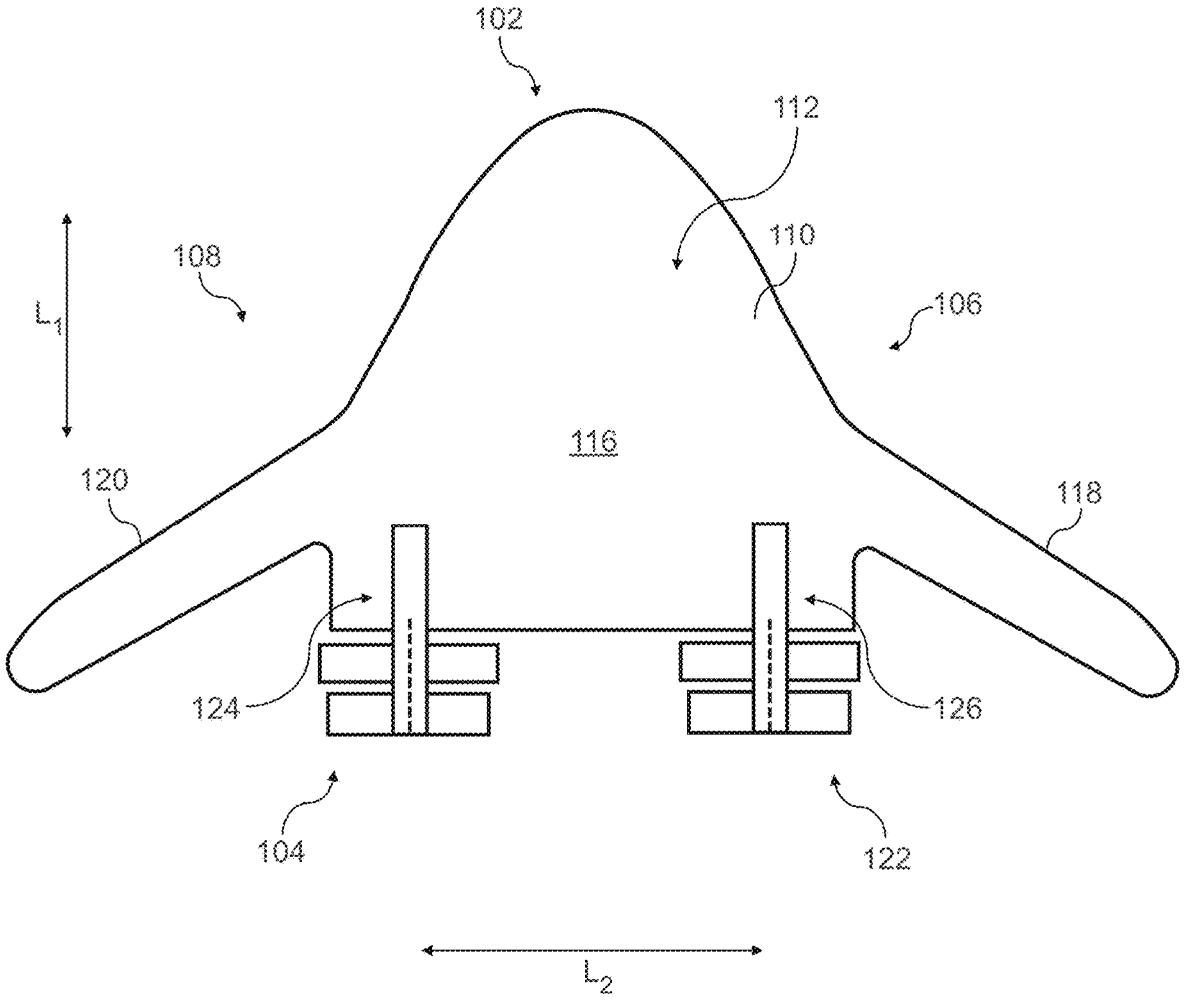
FIG. 19 is a schematic view of an aircraft in accordance with another exemplary embodiment of the present disclosure.

Referring now to FIG. 19, a schematic view of an aircraft 100 in accordance with another exemplary embodiment of the present disclosure is depicted. The exemplary aircraft 100 of FIG. 19 may be configured in a similar manner as the exemplary aircraft 100 described herein above with reference to FIG. 1. Accordingly, the same or similar numbers may refer to the same or similar parts.

For example, the aircraft 100, as illustrated, is a blended wing aircraft that defines a longitudinal direction $L_1$ and a lateral direction $L_2$, featuring a body 110 that extends from a forward end 102 to an aft end 104. The body 110 defines a top side 112 and a bottom side 114. The aircraft 100 further includes a pair of wings, a first wing 118 extending outwardly from the body 110 on a starboard side 106 and a second wing 120 extending outwardly on a port side 108. These wings 118, 120 are integral to the aircraft 100, contributing to lift and stability during flight.

The aircraft 100 further includes a propulsion system 122 having a first engine 124 and a second engine 126, which are mounted to the body 110 and are spaced from one another along the lateral direction $L_2$. However, for the embodiment of FIG. 19, the first engine 124 and the second engine 126 are configured as open rotor engines, which are a type of gas turbine engine that lacks an outer nacelle enclosing a fan. This configuration can offer advantages in terms of weight reduction and increased efficiency.

As with the exemplary embodiments above, in this embodiment, the engines 124, 126 are depicted in a pusher configuration.

Figure 20:
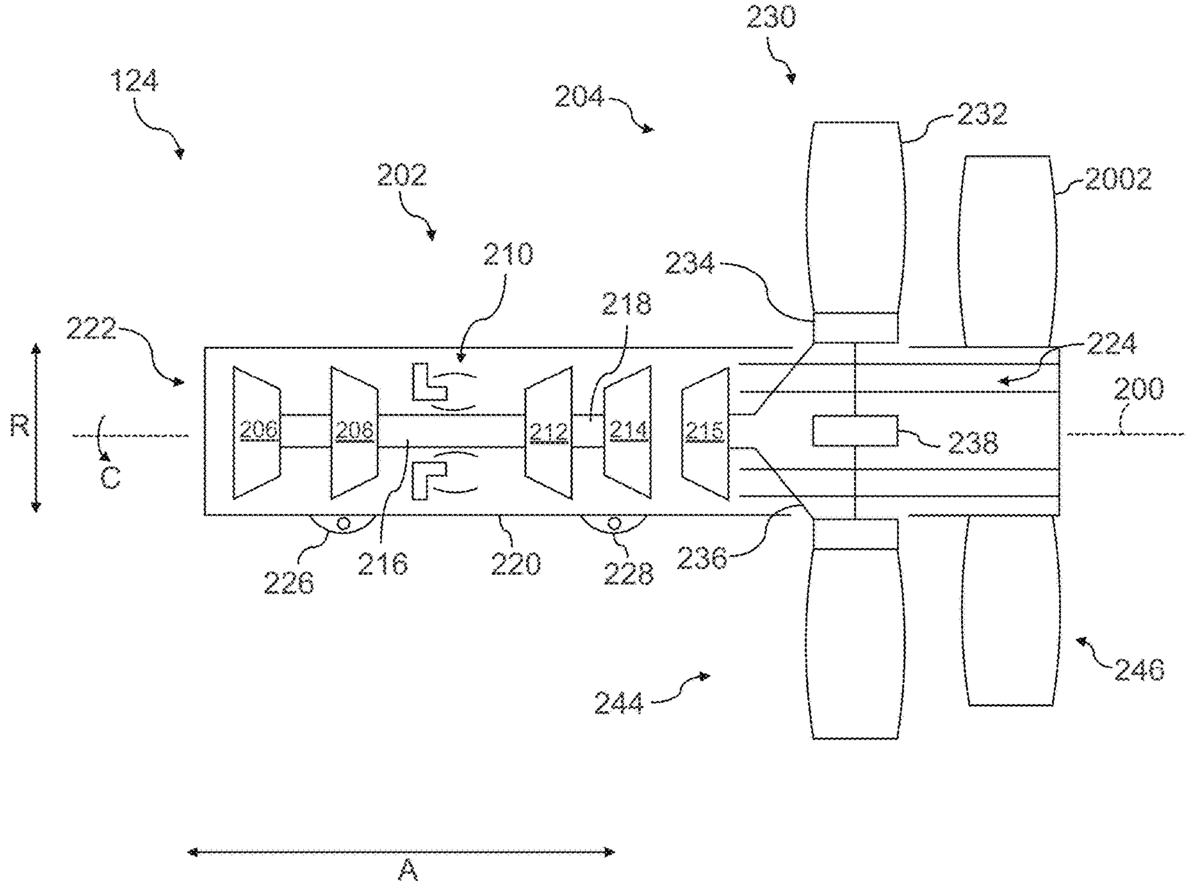
FIG. 20 is a schematic, cross-sectional view of a first engine of a propulsion system of the aircraft of FIG. 19 in accordance with an exemplary embodiment of the present disclosure.

In particular, referring now also to FIG. 20, a close-up, schematic view of the first engine 124 of FIG. 19 is provided. The exemplary first engine 124 of FIG. 20 may be configured in substantially the same manner as the exemplary first engine 124 described above with reference to FIG. 2, and the same or similar numbers may refer to the same or similar parts. As noted, the first engine is depicted in the pusher configuration. In particular, a fan assembly 204 of the first engine 124 includes a fan 230 positioned proximate an aft end of the first engine 124. The fan 230 is more specifically located downstream of a combustion section 210 along an axial direction A.

Moreover, as noted above, the first engine 124 is configured as an open rotor engine, such that the fan assembly 230 is not enclosed by an outer nacelle (c.f., outer nacelle 240 of FIG. 2). The fan assembly 240 includes a plurality of open rotor fan blades 232. In addition, the fan assembly 240 includes a plurality of outlet guide vanes 2002 that are stationary along a circumferential direction C, and are configured to straighten an airflow from the fan blades 232 to provide a more efficient forward thrust for the first engine 124.

The first engine 124, as illustrated, offers a compact and efficient propulsion solution, particularly advantageous for a blended wing aircraft where aerodynamic efficiency and reduced drag desired. The positioning of the fan assembly 204 in the pusher configuration allows for a shorter engine length and potentially lower weight, contributing to the overall performance benefits of the aircraft 100.

The specific design and arrangement of the engine 124 can be varied to suit different aircraft designs and performance requirements. The components described, such as the compressors 206, 208, turbines 212, 214, and fan assembly 204, can be scaled and adapted to provide the desired thrust and efficiency for a particular aircraft application. The present disclosure contemplates all such variations and modifications as falling within the scope of the appended claims.

As will be appreciated from the description hereinabove, in addition to other benefits, it was found that the blended wing body design allows for mounting engines of the blended wing aircraft in a pusher configuration, which can provide for a less complex engine for a given thrust class and efficiency level. In particular, arranging the engines in a pusher configuration locates a fan of the respective engine next to a power turbine (also referred to as a low pressure turbine), such that a length of a shaft driving the fan may be reduced. In addition, with at least certain mounting configurations, mounting the engines in the pusher configuration can allow a fan of each engine to ingest a relatively large amount of boundary layer airflow over the body of the aircraft. In such a manner, the fan(s) can reenergize such airflow and reducing a total drag on the aircraft, which in turn can improve an overall aerodynamic efficiency of the aircraft. Aspects of the present disclosure are directed to a blended wing aircraft defining a longitudinal direction and a lateral direction, the blended wing aircraft including: a body; a pair of wings extending outward from the body along the lateral direction; and a propulsion system having an engine mounted to the body, the engine defining an axial direction and having a combustion section and a fan, the fan positioned downstream of the combustion section along the axial direction.

Further aspects are provided by the subject matter of the following clauses:

A blended wing aircraft defining a longitudinal direction and a lateral direction, the blended wing aircraft comprising: a body; a pair of wings extending outward from the body along the lateral direction; and a propulsion system comprising an engine mounted to the body, the engine defining an axial direction and having a combustion section and a fan, the fan positioned downstream of the combustion section along the axial direction.

The blended wing aircraft of any preceding clause, wherein the body defines a top side, and wherein the engine is mounted to the top side of the body.

The blended wing aircraft of any preceding clause, wherein the body defines a bottom side, and wherein the engine is mounted to the bottom side of the body.

The blended wing aircraft of any preceding clause, wherein the engine is a gas turbine engine.

The blended wing aircraft of any preceding clause, wherein the gas turbine engine is a turbofan engine.

The blended wing aircraft of any preceding clause, wherein the gas turbine engine comprises a turbomachine, wherein the fan is driven by the turbomachine, wherein the turbomachine defines a turbomachine inlet, and wherein the body defines an airflow duct extending from a duct inlet to a duct outlet, wherein the body defines a flowpath surface, wherein the duct inlet is located at the flowpath surface, and wherein the duct outlet is located at the turbomachine inlet to provide an airflow to the turbomachine inlet.

The blended wing aircraft of any preceding clause, wherein the body defines a top side and a bottom side, and wherein the duct inlet is located at the flowpath surface on the top side of the body.

The blended wing aircraft of any preceding clause, wherein the body defines a top side and a bottom side, and wherein the duct inlet is located at the flowpath surface on the bottom side of the body.

The blended wing aircraft of any preceding clause, wherein the body defines a trailing edge, and wherein the gas turbine engine is mounted at the trailing edge.

The blended wing aircraft of any preceding clause, wherein the gas turbine engine is integrated into the trailing edge.

The blended wing aircraft of any preceding clause, wherein the body defines a trailing edge and a flowpath surface, wherein the engine is mounted at the trailing edge, and wherein the flowpath surface defines an inlet channel for the engine.

The blended wing aircraft of any preceding clause, wherein the engine is a gas turbine engine comprising a turbomachine, wherein the fan is driven by the turbomachine, wherein the turbomachine defines a turbomachine inlet, and wherein the inlet channel extends to the turbomachine inlet.

The blended wing aircraft of any preceding clause, wherein the inlet channel is a first inlet channel, wherein the flowpath surface further defines a second inlet channel and a third inlet channel, wherein the second inlet channel and third inlet channel are positioned on opposite sides of the first inlet channel and each extend to the fan.

The blended wing aircraft of any preceding clause, wherein the body defines a top side, and wherein the first inlet channel, the second inlet channel, and the third inlet channel are each located on the top side of the body.

The blended wing aircraft of any preceding clause, wherein the inlet channel defines an upstream end and a downstream end, wherein the upstream end defines an upstream width along the lateral direction, and wherein the downstream end defines a downstream width along the lateral direction less than the upstream width.

The blended wing aircraft of any preceding clause, wherein the flowpath surface further defines a deflection bump located upstream of the inlet channel or positioned within the inlet channel.

The blended wing aircraft of any preceding clause, wherein the deflection bump defines an apex and a bump height ($H_B$) at the apex, wherein turbomachine inlet defines an inlet diameter ($D_I$), and wherein the bump height (BH) is less than the inlet diameter ($D_I$).

The blended wing aircraft of any preceding clause, wherein the blended wing aircraft defines a length (L) from the apex to the turbomachine inlet along the longitudinal direction and an inlet height ($H_I$), wherein the inlet height ($H_I$) is equal the inlet diameter ($D_I$) minus a depth of the inlet channel at a downstream end, and wherein the bump height ($H_B$) is greater than or equal to $H_I/(\pi \times L)$ and less than or equal to $[\pi \times (H_I + D_I)]/L$.

The blended wing aircraft of any preceding clause, wherein the deflection bump is located upstream of the inlet channel.

The blended wing aircraft of any preceding clause, wherein the deflection bump defines a bump width along the lateral direction, wherein the inlet channel defines an upstream end, wherein the upstream end defines an upstream width along the lateral direction, and wherein the bump width is greater than the upstream width.

The blended wing aircraft of any preceding clause, wherein the engine is a gas turbine engine comprising a turbomachine, wherein the blended wing aircraft further comprises a pylon, wherein the turbomachine is coupled to the body using the pylon, wherein the turbomachine defines a turbomachine inlet, and wherein the turbomachine inlet is spaced from a flowpath surface of the body.

The blended wing aircraft of any preceding clause, wherein the gas turbine engine defines a fan inlet, and wherein the fan inlet is positioned to receive a boundary layer airflow over the flowpath surface of the body.

The blended wing aircraft of any preceding clause, wherein the gas turbine engine is a turbofan engine, wherein the turbofan engine comprises a nacelle extending around the fan and defining the fan inlet, and wherein the nacelle is connected to the flowpath surface of the body.

The blended wing aircraft of any preceding clause, wherein the fan is a variable-pitch fan.

The blended wing aircraft of any preceding clause, wherein the fan is moveable between a forward thrust pitch angle and a reverse thrust pitch angle.

The blended wing aircraft of any preceding clause, wherein the engine is a first engine, wherein the propulsion system further comprises a second engine spaced from the first engine along the lateral direction.

The blended wing aircraft of any preceding clause, wherein the engine is mounted to the body at an aft end of the blended wing aircraft.

The blended wing aircraft of any preceding clause, wherein the engine is a gas turbine engine comprising turbomachine and a fan, wherein the fan is overhung from the body at an aft end of the blended wing aircraft.

The blended wing aircraft of any preceding clause, wherein the fan defines a fan inlet, wherein the body defines a flowpath surface, wherein the fan inlet extends upward past the flowpath surface at the aft end and downward past the flowpath surface at the aft end.

The blended wing aircraft of any preceding clause, wherein the engine is a gas turbine engine comprising a turbomachine, wherein the turbomachine comprises a drive turbine and a compressor section, wherein the drive turbine is rotatably coupled to the fan to drive the fan, and wherein the drive turbine is rotatably de-coupled from the compressor section.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A blended wing aircraft defining a longitudinal direction and a lateral direction, the blended wing aircraft comprising:

a body;

a pair of wings extending outward from the body along the lateral direction; and a propulsion system comprising an engine mounted to the body, the engine defining an axial direction and having a combustion section and a fan, the fan positioned downstream of the combustion section along the axial direction;

wherein the body defines a trailing edge and a flowpath surface, wherein the engine is mounted at the trailing edge, and wherein the flowpath surface defines an inlet channel for the engine;

wherein the engine is a gas turbine engine comprising a turbomachine, wherein the fan is driven by the turbomachine, wherein the turbomachine defines a turbomachine inlet, and wherein the inlet channel extends to the turbomachine inlet;

wherein the flowpath surface further defines a deflection bump located upstream of the inlet channel or positioned within the inlet channel;

wherein the deflection bump defines an apex and a bump height ($H_B$) at the apex, wherein turbomachine inlet defines an inlet diameter ($D_I$), and wherein the bump height ($H_B$) is less than the inlet diameter ($D_I$);

wherein the blended wing aircraft defines a length (L) from the apex to the turbomachine inlet along the longitudinal direction and an inlet height ($H_I$), wherein the inlet height ($H_I$) is equal the inlet diameter ($D_I$) minus a depth of the inlet channel at a downstream end, and wherein the bump height ($H_B$) is greater than or equal to $H_I/(\pi\times L)$ and less than or equal to $[\pi\times(H_I+D_I)]/L$.

2. The blended wing aircraft of claim 1, wherein the body defines a top side, and wherein the engine is mounted to the top side of the body.

3. The blended wing aircraft of claim 1, wherein the engine is a gas turbine engine.

4. The blended wing aircraft of claim 3, wherein the gas turbine engine is a turbofan engine.

5. The blended wing aircraft of claim 1, wherein the engine is a first engine, wherein the propulsion system further comprises a second engine spaced from the first engine along the lateral direction.

6. The blended wing aircraft of claim 1, wherein the engine is a gas turbine engine comprising turbomachine and a fan, wherein the fan is overhung from the body at an aft end of the blended wing aircraft.

* * * * *